United States Patent
Kim et al.

(10) Patent No.: US 10,069,611 B2
(45) Date of Patent: *Sep. 4, 2018

(54) HARQ METHOD AND APPARATUS FOR COMMUNICATION SYSTEM

(71) Applicant: Samsung Electronics Co., Ltd., Gyeonggi-do (KR)

(72) Inventors: Youngbum Kim, Seoul (KR); Joonyoung Cho, Gyeonggi-do (KR); Jinkyu Han, Seoul (KR); Juho Lee, Gyeonggi-do (KR); Hyoungju Ji, Seoul (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,703

(22) Filed: Feb. 27, 2017

(65) Prior Publication Data

US 2017/0180096 A1    Jun. 22, 2017

Related U.S. Application Data

(63) Continuation of application No. 14/308,300, filed on Jun. 18, 2014, now Pat. No. 9,584,282, which is a
(Continued)

(30) Foreign Application Priority Data

| Mar. 11, 2011 | (KR) | 10-2011-0021633 |
| Aug. 12, 2011 | (KR) | 10-2011-0080405 |

(51) Int. Cl.
*H04L 5/00* (2006.01)
*H04L 1/18* (2006.01)
(Continued)

(52) U.S. Cl.
CPC .......... *H04L 5/0053* (2013.01); *H04L 1/1812* (2013.01); *H04L 1/1861* (2013.01);
(Continued)

(58) Field of Classification Search
CPC ...... H04J 3/16–3/1605; H04L 1/1664–1/1692; H04L 1/1812–1/1825;
(Continued)

(56) References Cited

U.S. PATENT DOCUMENTS

| 8,630,248 B2 | 1/2014 | Seo et al. |
| 8,634,358 B2 | 1/2014 | Damnjanovic et al. |

(Continued)

FOREIGN PATENT DOCUMENTS

| CN | 101094046 | 12/2007 |
| CN | 101094241 | 12/2007 |

(Continued)

OTHER PUBLICATIONS

NEC Group, "PHICH Carrier Linkage for Carrier Aggregation", R1-093861, 3GPP TSG-RAN WG1 Meeting #58bis, Oct. 12-16, 2009, 7 pages.

(Continued)

*Primary Examiner* — Timothy J Weidner
(74) *Attorney, Agent, or Firm* — The Farrell Law Firm, P.C.

(57) ABSTRACT

Disclosed is a method for communication of a terminal in a communication system, including receiving downlink control information (DCI) for scheduling a second cell, transmitting uplink data corresponding to the DCI on a first subframe of the second cell, and receiving feedback information for the uplink data on a second subframe identified based on a time division duplex (TDD) uplink/downlink (UL/DL) configuration of a first cell, if the first cell and the second cell are configured for the terminal, and the TDD (Continued)

UL/DL configuration of the first cell and a TDD UL/DL configuration of the second cell are different, and the DCI for scheduling the second cell is received on the first cell.

20 Claims, 30 Drawing Sheets

Related U.S. Application Data continuation of application No. 13/417,851, filed on Mar. 12, 2012, now Pat. No. 9,356,756.

(51) Int. Cl.
*H04W 72/04* (2009.01)
*H04W 72/12* (2009.01)

(52) U.S. Cl.
CPC .......... *H04L 5/0055* (2013.01); *H04L 5/0078* (2013.01); *H04W 72/0446* (2013.01); *H04W 72/0453* (2013.01); *H04W 72/1284* (2013.01); *H04W 72/1289* (2013.01); *H04L 5/001* (2013.01); *H04L 5/0023* (2013.01); *H04L 5/0098* (2013.01)

(58) Field of Classification Search
CPC .... H04L 1/1854; H04L 1/1861–1/1864; H04L 1/1887; H04L 1/1893–1/1896; H04L 5/0001–5/26; H04W 72/005–72/14; H04W 76/002–76/068
See application file for complete search history.

(56) References Cited

U.S. PATENT DOCUMENTS

| | | | |
|---|---|---|---|
| 8,670,376 B2 | 3/2014 | Damnjanovic et al. | |
| 8,755,332 B2 | 6/2014 | Miki | |
| 8,780,841 B2 | 7/2014 | Earnshaw et al. | |
| 9,203,559 B2 | 12/2015 | Wang | |
| 9,356,756 B2 * | 5/2016 | Kim | H04L 1/1861 370/329 |
| 9,584,282 B2 * | 2/2017 | Kim | H04L 1/1861 370/329 |
| 2006/0203779 A1 | 9/2006 | Attar et al. | |
| 2008/0095109 A1 | 4/2008 | Malladi et al. | |
| 2010/0254329 A1 | 10/2010 | Pan et al. | |
| 2011/0105050 A1 * | 5/2011 | Khandekar | H04L 5/001 455/451 |
| 2011/0268032 A1 | 11/2011 | Kim et al. | |
| 2012/0113941 A1 | 5/2012 | Chung et al. | |
| 2012/0113946 A1 | 5/2012 | Seo et al. | |
| 2013/0155898 A1 | 6/2013 | Yin | |

FOREIGN PATENT DOCUMENTS

| | | |
|---|---|---|
| CN | 101162978 | 4/2008 |
| CN | 101567769 | 10/2009 |
| EP | 2 352 266 | 8/2011 |
| RU | 2007-137025 | 4/2009 |
| RU | 2009-111229 | 10/2010 |
| WO | WO 2011/005032 | 1/2011 |
| WO | WO 2011/008049 | 1/2011 |

OTHER PUBLICATIONS

3rd Generation Partnership Project; Technical Specification Group Radio Access Network; Evolved Universal Terrestrial Radio Access (E-UTRA); Physical Channels and Modulation (Release 8), 3GPP TS 36.211 V8.6.0, Mar. 2009, 16 pages.
Chinese Office Action dated Dec. 14, 2015 issued in counterpart application No. 201280012782.X, 13 pages.
Russian Office Action dated Jan. 13, 2016 issued in counterpart application No. 2013145553/07, 19 pages.
Japanese Office Action dated Feb. 8, 2016 issued in counterpart application No. 2014-192303, 9 pages.
ZTE, "Primary and Secondary PDCCH Design for LTE-A", R1-091707, 3GPP TSG-RAN WG1 meeting #57, May 4-8, 2009.
LG Electronics, "UL Control Channel Design to Support Carrier Aggregation", R1-091204, 3GPP TSG RAN WG1 #56bis, Mar. 23-27, 2009.
Chinese Office Action dated Aug. 8, 2016 issued in counterpart application No. 201280012782.X, 9 pages.

* cited by examiner

HARQ METHOD AND APPARATUS FOR COMMUNICATION SYSTEM

PRIORITY

This application is a Continuation Application of U.S. patent application Ser. No. 14/308,300, filed in the U.S. Patent and Trademark Office on Jun. 18, 2014, which is a Continuation Application of U.S. patent application Ser. No. 13/417,851, filed in the U.S. Patent and Trademark Office on Mar. 12, 2012, now U.S. Pat. No. 9,356,756, issued May 31, 2016, which claims priority under 35 U.S.C. 119(a) to applications filed in the Korean Intellectual Property Office on Mar. 11, 2011, Aug. 12, 2011 and Dec. 20, 2011, and assigned Serial Nos. 10-2011-0021633, 10-2011-0080405 and 10-2011-0138472, respectively, the contents of each of which are incorporated herein by reference.

BACKGROUND OF THE INVENTION

1. Field of the Invention

The present invention relates generally to a Hybrid Automatic Repeat reQuest (HARQ) system, and more particularly, to a HARQ method and apparatus for a system operating at least two cells.

2. Description of the Related Art

Mobile communication systems have evolved into high-speed, high-quality wireless packet data communication systems, such as, $3^{rd}$ Generation Partnership Project (3GPP) High Speed Packet Access (HSPA) and Long Term Evolution (LTE), $3^{rd}$ Generation Partnership Project 2 (3GPP2) High Rate Packet Data (HRPD), Ultra Mobile Broadband (UMB), and Institute of Electrical and Electronics Engineers (IEEE) 802.16e standard systems. These wireless packet data communication systems provide data and multimedia services beyond the early voice-oriented services.

As a representative broadband radio communication standard, LTE adopts Orthogonal Frequency Division Multiplexing (OFDM) in downlink and Single Carrier Frequency Division Multiple Access (SC-FDMA) in uplink.

In order to combat the occurance of decoding failure at initial transmission, LTE adopts HARQ for retransmission of the decoding-failed data on the physical layer. HARQ is a technique in which, when decoding has failed, the receiver sends the transmitter a Negative Acknowledgement (NACK), enabling the transmitter to retransmit the decoding-failed data. If the data is decoded successfully, the receiver sends the transmitter an Acknowledgement (ACK), enabling the transmitter to send new data.

SUMMARY OF THE INVENTION

The present invention has been made to address at least the above problems and/or disadvantages and to provide at least the advantages described below. Accordingly, an aspect of the present invention provides a HARQ method and apparatus that is capable of improving communication efficiency in a communication system having multiple cells.

In accordance with an aspect of the present invention, a method for communication of a terminal in a communication system includes receiving downlink control information (DCI) for scheduling a second cell, transmitting uplink data corresponding to the DCI on a first subframe of the second cell, and receiving feedback information for the uplink data on a second subframe identified based on a time division duplex (TDD) uplink/downlink (UL/DL) configuration of a first cell, if the first cell and the second cell are configured for the terminal, and the TDD UL/DL configuration of the first cell and a TDD UL/DL configuration of the second cell are different, and the DCI for scheduling the second cell is received on the first cell.

In accordance with another aspect of the present invention, a method for communication of a base station, in a communication system, includes transmitting, to a terminal, DCI for scheduling a second cell, receiving, from the terminal, uplink data corresponding to the DCI on a first subframe of the second cell, and transmitting, to the terminal, feedback information for the uplink data on a second subframe identified based on a TDD UL/DL configuration of a first cell, if the first cell and the second cell are configured for the terminal, and the TDD UL/DL configuration of the first cell and a TDD UL/DL configuration of the second cell are different, and the DCI for scheduling the second cell is received on the first cell.

In accordance with another aspect of the present invention, a terminal in a communication system includes a transceiver configured to transmit and receive a signal, and a controller coupled to the transceiver and configured to receive DCI for scheduling a second cell, transmit uplink data corresponding to the DCI on a first subframe of the second cell, and receive feedback information for the uplink data on a second subframe identified based on a TDD UL/DL configuration of a first cell, if the first cell and the second cell are configured for the terminal, and the TDD UL/DL configuration of the first cell and a TDD UL/DL configuration of the second cell are different, and the DCI for scheduling the second cell is received on the first cell.

In accordance with still another aspect of the present invention, a base station in a communication system includes a transceiver configured to transmit and receive a signal, and a controller coupled to the transceiver and configured to transmit, to a terminal, downlink control information (DCI) for scheduling a second cell, receive, from the terminal, uplink data corresponding to the DCI on a first subframe of the second cell, and transmit, to the terminal, feedback information for the uplink data on a second subframe identified based on a TDD UL/DL configuration of a first cell, if the first cell and the second cell are configured for the terminal, and the TDD UL/DL configuration of the first cell and a TDD UL/DL configuration of the second cell are different, and the DCI for scheduling the second cell is received on the first cell.

BRIEF DESCRIPTION OF THE DRAWINGS

The above and other aspects, features and advantages of the present invention will be more apparent form the following detailed description when taken in conjunction with the accompanying drawings, in which.

DETAILED DESCRIPTION OF EMBODIMENTS OF THE PRESENT INVENTION

Figure 1:
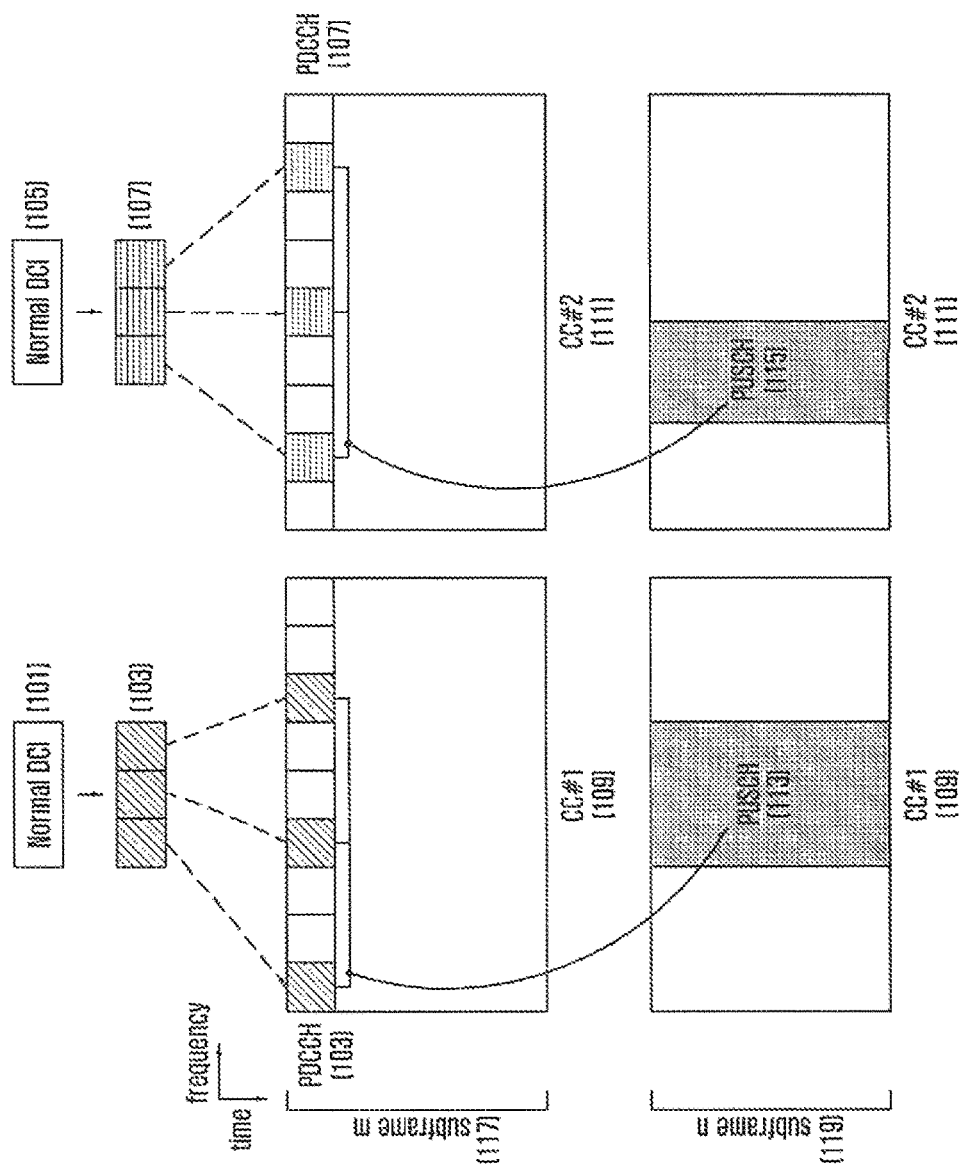
FIG. 1 is a diagram illustrating carrier aggregation of component carriers in an LTE Advanced (LTE-A) system, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

As used herein, the terms "embodiment," "example," "aspect," and "exemplification" should not be interpreted to mean that a certain aspect or design is superior to or advantageous compared to another aspect of design.

Further, unless expressly stated to the contrary, "or" refers to an inclusive or and not to an exclusive or. For example, the expression 'x uses a or b' means one of natural inclusive permutations.

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "and/or," includes any and all combinations of one or more of the associated listed items.

As used herein, the terms "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but may include other elements not expressly listed or inherent to such composition, mixture, process, method, article, or apparatus.

Although the terms first, second, etc., may be used herein to describe various elements, these elements should not be limited by these terms. These terms are only used to distinguish one element from another, and do not define an order or priority.

According to an embodiment of the present invention, a transceiver is included in a communication system and is capable of transmitting and/or receiving a signal and/or data. For example, the transceiver can be a terminal, a base station, or a network entity. The signal and/or data can include a training symbol, a control signal, control information, traffic, padding, or the like. The communication system including the transceiver is not limited to a specific signal format and/or a specific protocol, according to data modulation/demodulation, but can use various signal formats and/or various protocols. For example, the communication system can include systems based on IEEE 802.16, Worldwide Interoperability for Microwave Access (WiMAX), and LTE standards. The base station is responsible for resource allocation to terminals and can be one of a radio access unit, a base station controller, and a node of the network. The terminal can include a cellular phone, a smartphone, a computer, and a multimedia system having a communication function. Although embodiments of the present invention are directed to the Advanced Evolved-Universal Mobile Telecommunications System (UMTS) Terrestrial Radio Access (E-UTRA) (or LTE-A) system supporting a carrier aggregation system, embodiments of the present invention can be applied to other systems having a similar technical background and/or channel format. Also, it will be understood by those skilled in the art that the present invention can be applied to other communication systems, with a slight modification, without departing from the spirit and scope of the present invention. For example, the HARQ method and apparatus can be applied to the HSPA system supporting carrier aggregation.

When a TDD communication system, providing broadband service with carrier aggregation, supports cross carrier scheduling, the transceiver and/or system, according to an embodiment of the present invention, has to control transmission/reception timings of HARQ acknowledgement and/or scheduling information and uplink data cross-carrier-scheduled.

In the TDD communication system and/or transceiver according to an embodiment of the present invention, the transmission/reception timing relationship of the uplink data (i.e., PUSCH) cross-carrier scheduled on the second carrier according to the scheduling information (i.e., PDCCH) on the first carrier according to the combination of the TDD uplink-downlink configuration having aggregated carriers or HARQ acknowledgement (i.e., PHICH) of the first carrier corresponding to the PUSCH cross-carrier scheduled on the second carrier.

In the LTE-A system supporting carrier aggregation, if the component carrier carrying PDCCH, including Downlink Control Information (DCI) for supporting data transmission, and the component carrier, carrying the data scheduled on the PDCCH, differ from each other, this is referred to as cross carrier scheduling. In the cross carrier scheduling operation the component carrier carrying PDCCH including DCI is referred to as a "first component carrier", while the component carrier on which scheduling is done by PDCCH is referred to as a "second component carrier." Also, the cell operating with the first component carrier is referred to as a "first cell," and the cell operating with the second component is referred to as a "second cell." The terms "first component carrier" and "first cell" are used interchangeably, and the terms "second component carrier" and "second cell" are used interchangeably. Also, one eNB can have the first and second cells (or first and second component carriers) or the first and second eNBs can have the first and second cells, respectively.

The transceiver can include a first transceiver and/or a second transceiver. For example, the first transceiver can be an eNB, and the second transceiver can be a UE. According to an embodiment of the present invention, the transceiver can support HARQ. The HARQ can be applied to the UE's uplink data transmission. The HARQ for the UE's uplink data transmission is described in greater detail below according to an embodiment of the present invention. Although not described, the HARQ can be applied to the eNB's downlink data transmission.

The eNB can configure and transmit a Physical Downlink Shared Channel (PDSCH) by reflecting the transmission properties. The eNB can notify the UE of the transmission properties applied to the PDSCH through the PDCCH. The eNB can transmit, to the UE, the uplink scheduling information and the uplink transmission properties information through PDCCH. If PDCCH is received, the UE can configure and transmit PUSCH by reflecting the transmission properties recommended by the eNB.

In the radio communication system adopting HARQ, the receiver can improve the reception performance by combining the retransmitted signal with the previously received signals. The receiver can store the previously received but decoding-failed data by taking notice of the retransmission.

The HARQ process can be defined so as to allow the transmitter to transmit new data for the duration before receiving a response signal, such as an ACK or a NACK. The receiver can determine which previously received signal is to be combined with the retransmitted signal based on the HARQ Process Identifier (HARQ PID). The HARQ process can be categorized into one of a synchronous HARQ mode and an asynchronous HARQ mode depending on whether the transmitter notifies the receiver of the HARQ PID through control signaling. In the synchronous HARQ mode, the sequence number or index of the subframe carrying PDCCH can be used to identify the HARQ process instead of the HARQ PID. The subframe is a resource allocation unit in the time domain.

If it is necessary to change the transmission properties of PUSCH, such as the PUSCH transmission resource and modulation and coding scheme for retransmission, the eNB can transmit the PDCCH to indicate this change. The HARQ of which transmission properties can be changed is referred to as an adaptive synchronous HARQ. In case of the adaptive synchronous HARQ, the PDCCH can be transmitted along with PHICH for informing of the transmission properties, such as a precoding scheme of the UE.

According to an embodiment of the present invention a communication system can have at least two cells. For example, the at least two cells can include the first cell and the second cell, which use the first and second component carriers, respectively. The communication system also can support carrier aggregation for use of the first and second cells simultaneously. The carrier aggregation is a technique that improves the data rate using multiple carriers simultaneously.

One of the important features of the cellular communication system is to support scalable bandwidth for providing a high speed data service. For example, the LTE system can support various bandwidths, e.g., 20/15/5/3/1.4 Mhz. Meanwhile, the LTE-A system can support high data rate transmission over a wide bandwidth of up to 100 MHz for a single UE with a Carrier Aggregation (CA) technique. The mobile carriers can provide their services by selecting one of the available bandwidths, and the UE can operate with various capabilities between a minimum 1.4 MHz bandwidth and a 20 MHz bandwidth. Meanwhile, LTE-A aiming to meet the International Mobile Telecommunications-Advanced (IMT-Advanced) requirements can provide a broadband service at the data rate of up to 100 MHz through carrier aggregation.

In order to support the high data rate transmission, the LTE-A system requires a bandwidth that is wider than that of the LTE system while preserving backward compatibility to the legacy systems for supporting the LTE UEs. For the backward compatibility, the system bandwidth of the LTE-A system is divided into a plurality of subbands or Component Carriers (CC) that can be used for transmission/reception of LTE UEs and that can be aggregated for the high data rate transmission of the LTE-A system with the transmission/ reception process of the legacy LTE system per component carrier. Typically, the scheduling information for the data to be transmitted on the component carriers is transmitted to the UE in DCI. The DCI can be defined in various formats, and one of the predefined DCI formats can be used according whether scheduling information is of uplink or downlink, whether the DCI is compact DCI, whether spatial multiplexing with multiple antennas is applied, and whether the DCI is the power control DCI.

For example, the DCI format 0 carrying the control information on the uplink data transmitted without application of Multiple Input Multiple Output (MIMO) can include following control information.

Format 0/Format 1A flag: differentiates between DCI format 0 and DCI format 1A.

Frequency hopping flag: indicates whether the frequency hopping is applied for PUSCH as UL data channel.

Resource allocation type 0/1 flag: differentiates between resource allocation type 0 and resource allocation type 1. Type 0 allocates a resource in a unit of a Resource Block Group (RBG) using a bitmap format. In the LTE/LTE-A system, the scheduling resource unit is Resource Block (RB) representing a time and frequency resource region, and RBG can be composed of a plurality of RBs. The RBG can be a basic unit of a scheduling resource in type 0. In type 1, a specific RB can be allocated in the RB G.

Resource block assignment: indicates resource blocks to be assigned to the UE. The basic unit of radio resource allocation is a RB representing a time and frequency region.

Modulation and coding scheme and redundancy version: indicates a modulation scheme and coding rate used in a data transmission and redundancy version of the HARQ.

New Data Indicator (NDI): indicates whether the packet is a new transmission or a retransmission.

TPC command for PUSCH: indicates a Transmit Power Control command for PUSCH.

Cyclic shift for DM RS: indicates a cyclic shift to use for deriving an uplink demodulation reference signal from the base sequence.

Channel Quality Indication (CQI) request: requests the UE to send a CQI.

The DCI is channel-coded and modulated and then transmitted on PDCCH.

FIG. 1 is a diagram illustrating carrier aggregation of component carriers in the LTE-A system, according to an embodiment of the present invention. Each of the two carriers can include downlink and/or uplink time durations, and FIG. 1 illustrates the scheduling of a UE for uplink transmission on the two component carriers.

In FIG. 1, a DCI 101, transmitted at an $m^{th}$ subframe of a first Component Carrier (CC#1) 109, can be channel-coded and interleaved to generate a PDCCH 103 in a predetermined format defined in the LTE standard. The DCI 101 can also be the information included in the PDCCH 103. The subframe can be a basic time unit of scheduling in the LTE and/or LTE-A system. The PDCCH 103 can include scheduling information for a PUSCH 113 as a data channel allocated to the UE at an nth subframe (here, n>m) of the CC#1 109. A DCI 105 transmitted at an $m^{th}$ subframe of a second component carrier (CC#2) 111 is channel-coded and interleaved to generate a PDCCH 107, or is included in the PDCCH 107. The PDCCH 107 is the control channel transmitted from the eNB to the UE and can include scheduling information for a PUSCH 115 as an uplink data channel allocated to the UE at an $n^{th}$ subframe of the CC#2 111.

In the LTE-A system supporting carrier aggregation, the data and/or DCI for supporting the data transmission can be transmitted per component carrier as shown in FIG. 1.

When the PUSCH transmits data on each component carrier, it is possible to overcome the influence of the interference to the PUSCH transmission/reception using frequency selective scheduling and/or HARQ. However, HARQ is not applied to the transmission of the PDCCH carrying DCI and the PDCCH is transmitted over the whole system band such that the frequency selective scheduling cannot be applied, resulting in a necessity for a DCI transmission method in consideration of interference.

In order to improve the reception reliability of DCI, the component carrier carrying DCI can be changed or different component carriers are used for transmitting the DCI and data. This can be referred to as cross-carrier-scheduling. For example, if it becomes difficult to expect DCI reception reliability due to the increase of interference on the CC#2 111 in FIG. 1, the component carrier for transmitting the DCI can be switched from the CC#2 to the CC#1, which is relatively less influenced by the interference.

A detailed description of the cross carrier scheduling in provided below with respect to FIG. 2.

Figure 2:
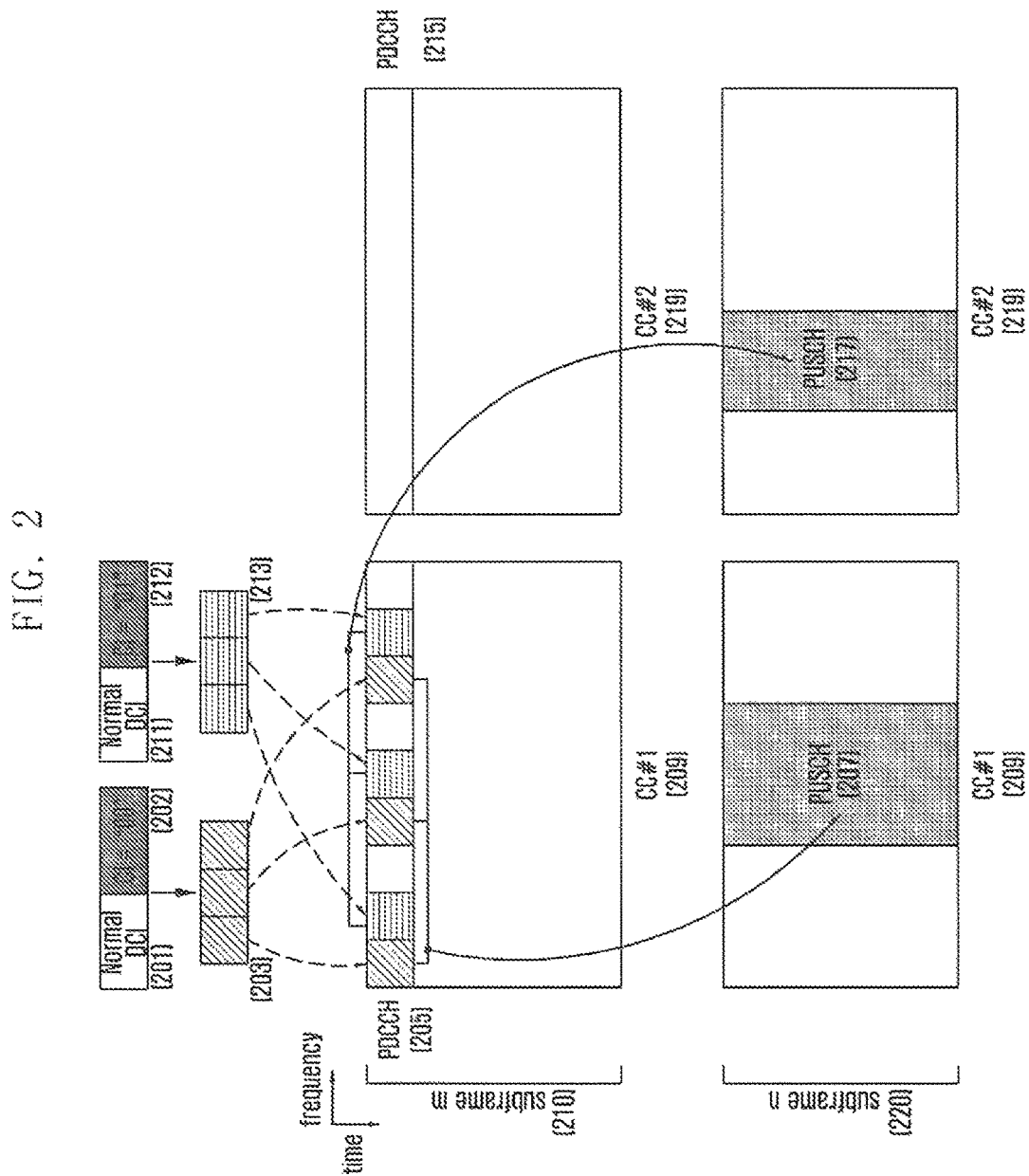
FIG. 2 is a diagram illustrating cross carrier scheduling in the LTE-A system supporting carrier aggregation, according to an embodiment of the present invention.

FIG. 2 is a diagram illustrating cross carrier scheduling in the LTE-A system supporting carrier aggregation, according to an embodiment of the present invention. FIG. 2 shows the cross scheduling operation for an LTE-A UE operating with two aggregated uplink carriers and two aggregated downlink carriers.

Since the downlink interference on a CC#2 219 is greater than that on a CC#1 209, it becomes difficult to expect satisfactory reception performance of the DCI as the scheduling information for uplink data transmission of the UE on the CC#2 219. In this case, the eNB can transmit the DCI on CC#1 209. The eNB can transmit a Carrier Indicator (CI) indicating the component carrier on which the DCI indicates the resource allocation information and/or transmission format of the scheduled data. For example, CI='00' indicates the scheduling information for the CC#1 209, and CI='01' indicates the CC#2 219.

The eNB can combine a DCI 201 indicating the resource allocation information and/or transmission format for the data (i.e., PUSCH) 207 scheduled at an nth subframe 220 of the CC#1 209 and a CI 202 to generate an extended DCI, and performs channel coding on the extended DCI as denoted by reference number 203. The eNB generates a PDCCH through modulation and interleaving on the channel-coded DCI and maps the PDCCH to a PDCCH region 205 at an $m^{th}$ subframe 210 of the CC#1 209. The eNB also can combine a DCI 211 indicating the resource allocation and/or transmission format of the data (i.e., PUSCH) 217 and a CI 212 to generated an extended DCI and performs channel coding on the extended DCI as denoted by reference number 213. The eNB generates the PDCCH through modulation and interleaving on the channel-coded DCI and maps the PDCCH to the PDCCH region 205 at the $m^{th}$ subframe 210 of the CC#1 209.

The carrier aggregation can be categorized into one of the following categories according to the implementation scenarios. The first and second cells can have almost the same coverage in size and be overlapped with each other. At this time, the eNB can operate the first and second cells with shared antenna(s) or the antennas can be arranged closely. In an embodiment of the present invention, the second cell has greater coverage than the first cell and their antenna(s) are oriented in the almost same direction. The first cell secures enough coverage while the second cell secures enough data rate. Also, when the two cells share the same antenna(s) and are deployed closely, the antennas of the two cells are oriented in different directions. It is possible to guarantee an improved data rate for the UE at the cell edge where the two cells are overlapping. Also, the first cell can be responsible for the macro area while the second cell can be responsible for a hotspot within the macro area of the first cell. An extra antenna can be deployed at the hotspot of the second cell.

The second cell can be scheduled by the first cell. In an embodiment of the present invention in which a UE transmits uplink data to an eNB at a subframe of the second cell, the eNB can transmit the HARQ acknowledgement corresponding to the uplink data and/or the scheduling information for the transmission (or retransmission) data. The second cell can operate at least one subframe to which a synchronous HARQ for identifying the time duration for the UE's uplink data transmission (or retransmission) is implicitly applied.

The first and second cell can operate in different TDD configurations. The TDD configuration can include information on the arrangement of uplink and downlink subframes used in the cell. Specifically, the TDD configuration includes the uplink and downlink allocation information and uplink and downlink pattern in a radio frame.

In the LTE system, a cell operates in one of the TDD configurations 0 to 6 as listed in Table 1.

In the TDD system, the downlink and uplink communication share the same frequency, such that the uplink and downlink signals are differentiated in the time domain. In the LTE TDD system, the uplink and downlink signals are discriminated from each other in units of subframes. In TDD system, the number of downlink subframes can be equal to, greater than, or less than the number of uplink subframes according to the traffic load. In the LTE system, the subframe has a length of 1 ms, and 10 subframes form a radio frame.

TABLE 1

| TDD Config. | Subframe | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 1 shows TDD configurations (TDD uplink-downlink configurations) defined in the LTE standard. In Table 1, subframe numbers 0 to 9 indicate the indices of subframes constituting one radio frame. Here, 'D' denotes a subframe reserved for downlink transmission, 'U' denotes a subframe reserved for uplink transmission, and 'S' denotes a special subframe. The special subframe consists of a Downlink Pilot Time Slot (DwPTS), a Guard Period (GP), and an Uplink Pilot Time Slot (UpPTS). The DwPTS has a short time duration as compared to a normal subframe, and can be responsible for the function of the normal downlink subframe. For example, the DwPTS can be used for transmitting control information in downlink or downlink data, especially when its length is long enough according to the configuration of the special subframe. Accordingly, the special subframe can be a time duration for transmitting a HARQ acknowledgement and/or scheduling information like the normal downlink subframe. The GP is the interval required for a downlink-to-uplink switch, and its length is determined according to the network configuration. The UpPTS can be used for transmitting a UE's Sounding Reference Signal (SRS) for uplink channel state estimation, and a UE's Random Access Channel (RACH).

In the case of TDD uplink-downlink configuration#6, the eNB can transmit downlink data and/or control information at subframes #0, #5, and #9 and uplink data and/control information at subframes #2, #3, #4, #7, and #8. Here, # indicates the number or index. The subframes #1 and #6, as special subframes, can be used for transmitting downlink control information and/or downlink data selectively, and SRS or RACH in uplink.

Since the downlink or uplink transmission is allowed for specific time duration in the TDD system, it is necessary to define the timing relationship among the uplink and downlink physical channels, such as a control channel for data scheduling, a scheduled data channel, and a HARQ ACK/NACK channel (HARQ acknowledgement) corresponding to the data channel.

For example, the LTE and/or LTE-A system adopts a synchronous HARQ having fixed data transmission timing in uplink. The uplink/downlink timing relationship among the PUSCH for uplink data transmission, the PDCCH as the control channel followed by PUSCH, and the PHICH as a physical channel carrying downlink HARQ ACK/NACK corresponding to the PUSCH, can be configured as shown in Tables 2 and 3.

If the PDCCH, including the DCI format 0 as uplink scheduling information, is transmitted by the eNB at nth subframe or the PHICH (or HARQ acknowledgement), carrying HARQ ACK/NACK, is transmitted by the eNB, the UE can transmit the PUSCH, carrying uplink data corresponding, to the PDCCH or HARQ acknowledgement at the $(n+k)^{th}$ subframe. At this time, k can be one of the values defined in the configurations as shown in Table 2.

TABLE 2

| TDD UL/DL Config-uration | DL subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

If the PHICH, carrying the downlink HARQ ACK/NACK, is received from the eNB at the $i^{th}$ subframe, the PHICH can correspond to the PUSCH transmitted by the UE at $(i-k)^{th}$ subframe. Here, k can be one of the values defined in the configurations as shown in Table 3.

TABLE 3

| TDD UL/DL Configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 |   |   |   |   | 7 | 4 |   |   |
| 1 |   | 4 |   |   | 6 |   |   | 4 |   | 6 |
| 2 |   |   |   | 6 |   |   |   |   | 6 |   |
| 3 | 6 |   |   |   |   |   |   |   | 6 | 6 |
| 4 |   |   |   |   |   |   |   |   | 6 | 6 |
| 5 |   |   |   |   |   |   |   |   | 6 |   |
| 6 | 6 | 4 |   |   |   |   | 7 | 4 |   | 6 |

In the LTE TDD system using the configurations of Tables 2 and 3, the downlink subframe is not defined for the PHICH transmission duration. In the case of TDD uplink-downlink configuration #1, the subframes #0 and #5 are downlink subframes but have no definition for the PHICH transmission time duration. This is because it is necessary to define just up to 4 subframes for PHICH corresponding to the total 4 uplink subframes among the 10 subframes constituting one radio frame in the TDD uplink-downlink configuration #1. Accordingly, there is no need to define PHICH transmission at the subframes #0 and #5.

Figure 3:
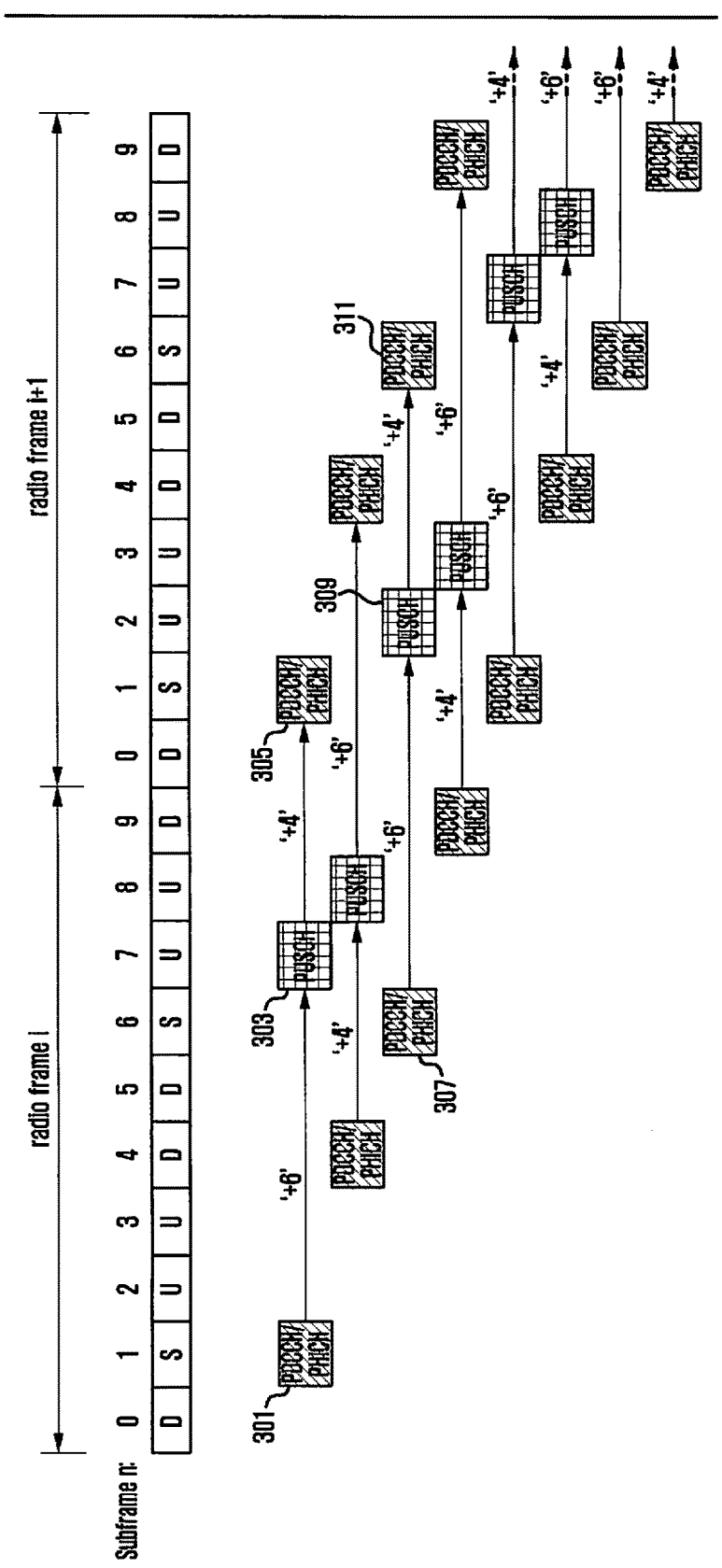
FIG. 3 is a diagram illustrating transmission/reception timing relationship of the LTE system operating in Time Division Duplex (TDD) uplink-downlink configuration #1, according to an embodiment of the present invention.

FIG. 3 is a diagram illustrating the transmission/reception timing relationship of the LTE system operating in TDD uplink-downlink configuration #1, according to an embodiment of the present invention. FIG. 3 shows the uplink subframes carrying uplink the PUSCH corresponding to the PDCCH or the PHICH, and downlink subframes carrying the PHICH corresponding to the PUSCH when the PDCCH or PHICH is transmitted at uplink or the special subframe in the system operating in TDD uplink-downlink configuration #1. The UE can transmit an uplink PUSCH 303 at subframe #7 of the $(i+1)^{th}$ radio frame in correspondence to a PDCCH or PHICH 301 transmitted by the eNB at subframe #1 of the $i^{th}$ radio frame. Also, the eNB can transmit PHICH 305 corresponding PUSCH 303 to the UE at subframe #1 of the $(i+1)^{th}$ radio frame. Also, the UE can transmit an uplink PUSCH 309 at subframe #2 of the $(i+1)^{th}$ radio frame in correspondence to a PDCCH or PHICH 307 transmitted by the eNB at the subframe #6 of the $i^{th}$ radio frame. The eNB can transmit a PHICH 311 corresponding to a PUSCH 309 to the UE at subframe #6 of the $(i+1)^{th}$ radio frame.

In the TDD system, since the PDCCH corresponding to the PUSCH, or the downlink transmission of the PHICH, is limited to specific downlink subframes, it is possible to reduce a transmission/reception processing time of the eNB and/or the UE. For example, in the case of the TDD uplink-downlink configuration #1 of FIG. 3, it is skipped to transmit the PDCCH for scheduling the PUSCH or the PHICH corresponding to the PUSCH at subframes #0 and #5.

When carrier aggregation is applied to the LTE-A system along with the timing relationship among the physical channels of LTE TDD system, it is necessary to define an extra timing relationship and/or operations in addition to the conventional timing relationship. Specifically, if the TDD uplink-downlink configurations of the carriers aggregated differ from each other, and if the cross carrier scheduling is applied, it is necessary to define the timing relationship among the PUSCH cross-carrier scheduled by PDCCH, the cross-carrier scheduled PUSCH, and the PHICH.

In the system supporting carrier aggregation, the TDD uplink-downlink configuration can be selected per component carrier according to the system organization scenario. For example, the eNB (or system) configures the uplink and downlink subframes equally on the first component carrier, while it configures the downlink subframes more than downlink subframes on the second component carrier to extend the downlink capacity. Also, the eNB (or system) can operate the TDD uplink-downlink configuration on the first component carry by taking notice of the compatibility with TD-SCDMA system as the conventional 3G TDD system to cancel the interference between the TD-SCDMA system and the LTE TDD system. The eNB (or system) can select a TDD uplink-downlink configuration for the second component carrier according to the traffic load without other restriction. The inter cell interference can be minimized by aggregating the component carriers not consecutive in the frequency domain.

Figure 4:
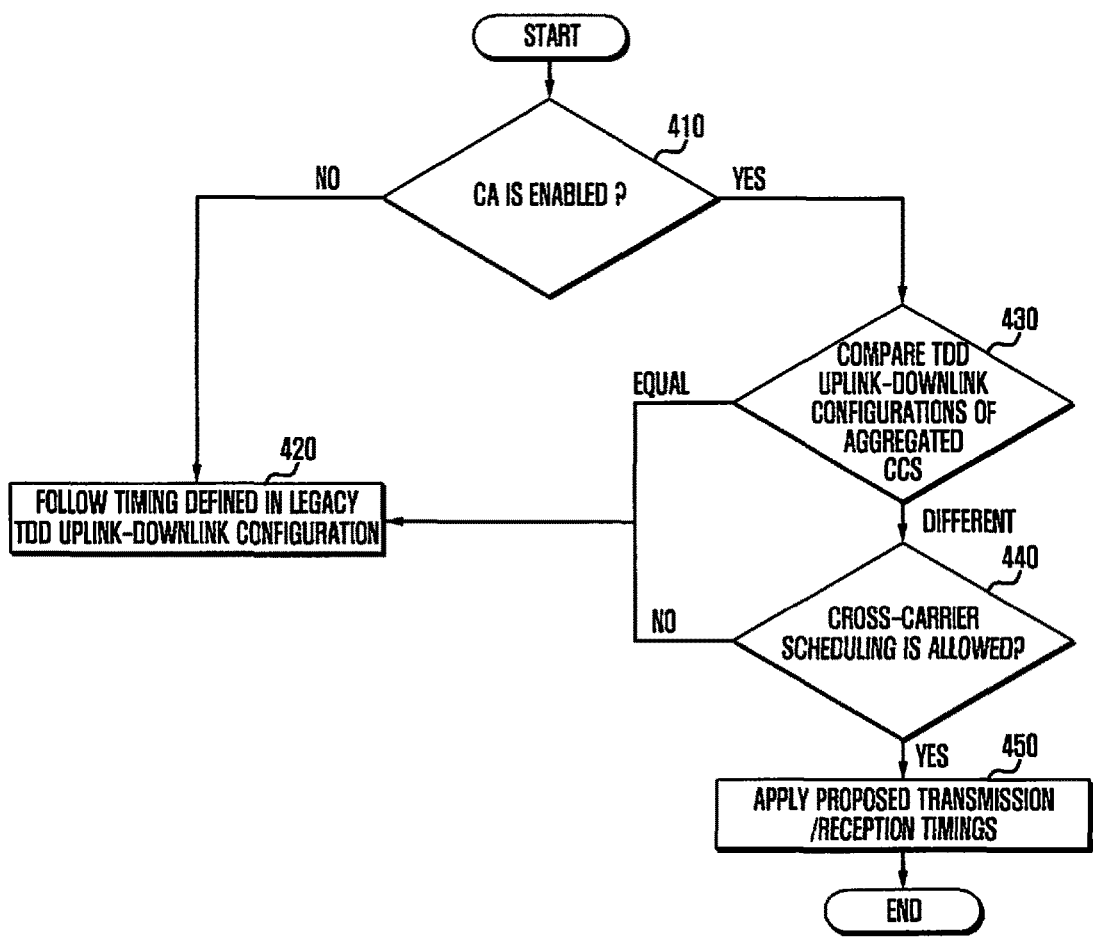
FIG. 4 is a flowchart illustrating a method for an enhanced Node B (eNB) and/or a UE to check the transmission/reception timing, according to an embodiment of the present invention.

FIG. 4 is a flowchart illustrating a method for the eNB and/or UE to check the transmission/reception timing, according to an embodiment of the present invention. In the procedure of FIG. 4, both the eNB and the UE perceive the timing relationship among the PDCCH and the PUSCH scheduled by the PDCCH, and the PHICH. The procedure of FIG. 4 can be commonly applied to the eNB and the UE.

The eNB or the UE checks whether carrier aggregation is enabled, in step 410.

If carrier aggregation is not enabled, the eNB or the UE follow the PDCCH/PUSCH/PHICH timing defined in the TDD uplink-downlink configuration of the system (e.g. LTE/LTE-A), in step 420.

If carrier aggregation is enabled, the eNB or the UE compares the TDD uplink-downlink configurations of the aggregated component carriers with each other, in step 430. If it is determined that the TDD uplink-downlink configurations are identical with each other, the methodology proceeds to step 420.

Otherwise, if it is determined that the TDD uplink-downlink configurations are different from each other, the eNB or the UE determines whether cross-carrier scheduling is enabled, in step 440. If it is determined that the cross-carrier scheduling is not enabled at step 440, the methodology proceeds to step 420.

If it is determined that the cross-carrier scheduling is enabled at step 440, the eNB or the UE applies the transmission/reception timing proposed, according to an aspect based on the relationship between the $k^{th}$ subframe carrying the PDCCH corresponding to the PUSCH to be scheduled and the $i^{th}$ subframe carrying the PHICH corresponding to the PUSCH, in step 450.

According to an embodiment of the present invention, the eNB's transmission timing of PDCCH including cross-carrier scheduling information for the PUSCH can be the $k^{th}$ subframe, i.e., the earliest (or latest) downlink subframe appearing since the UE's PUSCH transmission timing among the subframes on the first component carrier, which is at least j subframes before the UE's PUSCH transmission timing. Here, j and k are integers, and j can be a value for guaranteeing the UE's minimum signal processing time or the value set in consideration of signal transmission/reception time delay and/or decoding delay. For example, j can indicate four subframes. Under the condition of j, the time interval between the PDCCH and the PUSCH can be at least j subframes, and the eNB's scheduling efficiency can be improved by maintaining the least interval.

If the PUSCH is received from the UE, the eNB determines whether to transmit an ACK or a NACK and feeds back the PHICH carrying the HARQ ACK/NACK to the UE. The eNB can transmit the PHICH at the $i^{th}$ subframe, i.e., the earliest downlink subframe appearing after at least j subframes on the first component carrier since the subframe at which the PUSCH has been received. The $i^{th}$ subframe can be the time duration available for transmitting the HARQ acknowledgement corresponding to the PUSCH. Here, i is an integer. The eNB can secure the minimum signal processing time with the condition of j at the transmission timing of the PHICH corresponding to the PUSCH. The eNB's minimum signal processing time can be set to a value different from j in consideration of the UE's minimum signal processing time.

If it is determined to transmit a NACK in correspondence to the PUSCH received from the UE, the eNB can transmit the PDCCH for scheduling the retransmission of the PUSCH along with the PHICH such that the UE retransmits the PUSCH. Hereinafter, the PUSCH retransmission triggered by transmitting the PDCCH to the UE along with the PHICH is referred to as an adaptive retransmission or a retransmission. The eNB can configure or reconfigure the radio resource and/or the MCS for the PUSCH retransmission by transmitting the PDCCH. The PDCCH for scheduling the PUSCH retransmission can be transmitted at the $k^{th}$ subframe, i.e., a downlink subframe, on the first component carrier. When both the PHICH and the PDCCH for adaptive retransmission are received, the UE can perform the retransmission based on the information of the PDCCH.

In the system supporting carrier aggregation and cross-carrier scheduling according to an embodiment of the present invention, the transmission/reception timing relationship can include the following cases according to the comparison result between i and k.

If the UE's PHICH transmission timing (i.e., i) and the PDCCH transmission timing for PUSCH retransmission (i.e., k) are identical with each other (i.e., i=k), at step 450, the eNB and/or the UE can identify the PDCCH/PUSCH/PHICH timing relationship.

If the PHICH transmission timing is earlier than the PDCCH transmission timing for the PUSCH retransmission, i.e., i<k, at step 450, the eNB or the UE can identify the PDCCH/PUSCH/PHICH timing relationship, in accordance with FIGS. 5 to 11. If the PHICH transmission timing is later than the PDCCH transmission timing for the PUSCH retransmission, i.e., i>k, the eNB or the UE can identify the PDCCH/PUSCH/PHICH timing relationship in accordance with FIGS. 12 to 17.

Since the TDD configurations available for each of the first and second cells are 7, the number of available combinations of TDD configurations becomes 49. When a synchronous HARQ is applied for uplink data (i.e., PUSCH), the UE and/or the eNB can check the time duration for uplink data transmission or retransmission. In order to support synchronous uplink HARQ, the UE and/or the eNB should have the capability to determine or know the eNB's transmission timing of the HARQ acknowledgement and/or the scheduling information for the uplink data. The HARQ acknowledgement can include the PHICH while the uplink transmission scheduling information can be included in the PDCCH. When the adaptive synchronous HARQ is adopted to the system, both the PHICH and the PDCCH can be transmitted.

A description is made of the method for identifying the time duration carrying HARQ acknowledgement and/or uplink scheduling information at UE and/or eNB.

Among the combinations of TDD configurations, there can be 7 combinations in which TDD configurations of the first and second cells are identical with each other. In this case, the scheduling information for the time duration (or subframe number) for transmitting a HARQ acknowledgement corresponding to the UE's uplink data transmission subframe and/or the time duration (or subframe number) for transmitting the scheduling information for the data transmission (or retransmission) can be used as the same. When the predetermined timing information is included in the TDD configurations 0 to 6 as shown in Table 1, the UE's uplink data (i.e., the PUSCH) transmission (or retransmission) is performed at a predetermined uplink subframe on the second cell, according to the predetermined timing information, and the eNB's HARQ acknowledgement (i.e., the PHICH) transmission corresponding to the UE's uplink data can be performed at a predetermined subframe of the first cell, according to the predetermined timing information. The scheduling information (e.g., the PDCCH) can be transmitted at the subframe carrying the HARQ acknowledgement. Specifically, when the TDD configurations of the first and second cells are identical with each other, the eNB and/or the UE can determine or identify using the predetermined timing information for each cell.

Among the TDD configuration combinations, there can be 42 combinations in which the TDD configurations of the first and the second cells are different from each other. The UE can transmit data (i.e., the PUSCH) to the eNB at the first subframe in the second cell. In the case of the synchronous HARQ, the eNB and/or UE can identify the second subframe as the earliest time duration available for the UE's data transmission (or retransmission), which appears after the first subframe of the second cell. Specifically, the second subframe can be the earliest time duration available for the UE's data transmission (retransmission) after the first subframe of the second cell. When the carrier aggregation is disabled, the second subframe can be identical with the time duration identified by the UE and/or the eNB in the system having only the second cell and operating in the synchronous HARQ.

The eNB can receive the data (i.e., the PUSCH) transmitted by the UE at the first subframe of the second cell. The eNB can transmit, to the UE, the HARQ acknowledgement corresponding to the first subframe and/or the scheduling information for the second subframe at one (or at least one) of the subframes of the first cell within in the time duration between the first and second subframes.

Here, the first cell's subframes in the time duration between the first and second subframes can include the $i^{th}$ subframe and $k^{th}$ subframe. Here, i and k are integers. The $i^{th}$ subframe can be the time duration available for transmitting the HARQ acknowledgement (i.e., the PHICH) corresponding to the first subframe after the first subframe. For example, the time duration available for transmitting PHICH can be the time duration satisfying Equation (1).

$$\text{PHICH timing is the earliest downlink subframe } i >= t1+4 \quad (1)$$

In Equation (1), subframe i denotes the $i^{th}$ subframe, t1 denotes the first subframe, and 4 denotes that the first time duration consists of 4 subframes. Specifically, the $i^{th}$ subframe can be the earliest downlink time duration satisfying the condition that it arrives at least the predetermined first time duration after the first subframe. The downlink time duration can include a special subframe as well as downlink subframes. The predetermined first time duration can be set in consideration of the received signal decoding delay. For example, the first time duration can be determined in consideration of the interval between the UE's PUSCH transmission timing and the eNB's PUSCH reception timing, the received PUSCH decoding time, and/or the PHICH generation time according to the decoding result.

The method for determining the $i^{th}$ subframe as the time duration available for the PHICH transmission can be modified in various ways. For example, this method can be modified by reflecting additional restrictions in addition to Equation (1). Specifically, the downlink subframe having no definition of the PHICH transmission time duration in Table 2 or 3 can be input into the $i^{th}$ subframe calculation. Otherwise, if the $i^{th}$ subframe calculated by Equation (1) is identical with the downlink subframe for which a PHICH transmission time duration is not defined, the $i^{th}$ subframe is replaced with the earliest downlink subframe appearing after the $i^{th}$ subframe. The LTE UE receives the PDCCH at the resource remaining after subtracting the resource region on which PHICH is transmitted. Accordingly, if the PHICH is transmitted at the downlink subframe for which no PHICH transmission time duration is defined, the legacy UE cannot be aware of the PHICH, and thus fails to receive the PDCCH.

The $k^{th}$ subframe can be the time duration available for the eNB to transmit scheduling information (e.g., the PDCCH) for the second subframe before the second subframe. The time duration available for PDCCH transmission can be the time duration satisfying Equation (2).

$$\text{PDCCH timing is the latest downlink subframe} \\ k<=t2-4 \quad (2)$$

In Equation (2), subframe k denotes the $k^{th}$ subframe, t2 denotes a second subframe, and 4 denotes that the predetermined second time duration consists of 4 subframes. Specifically, the $k^{th}$ subframe can be the latest downlink subframe satisfying the condition of proceeding at least the predetermined second time duration to the second subframe. The downlink time duration can include special subframes as well as normal downlink subframes. The predetermined second time duration can be configured in consideration of a received signal decoding delay. For example, the predetermined second time duration can be configured in consideration of the interval between the eNB's PDCCH transmission time and the UE's PDCCH reception time, the received PDCCH decoding time, and/or the PUSCH generation time according to the decoding result.

When the TDD configurations of the first and second cells differ from each other, the $i^{th}$ subframe and the $k^{th}$ subframe can be determined. A description is provided below of the PHICH and/or the PDCCH transmission time duration according to the relationship between i and k. When the carrier aggregation is enabled to secure broadband, the system and/or the transceiver supporting the TDD configuration can operate regardless of the number of component carriers, according to an embodiment of the present invention.

When i is equal to k (i==k), the eNB can transmit the PHICH and/or the PDCCH at the $i^{th}$ subframe (or $k^{th}$ subframe). After receiving the PHICH and/or the PDCCH from the eNB, the UE can perform data transmission (or retransmission) at the second subframe of the second cell, according to the control information carried in the PHICH and/or the PDCCH.

When i less than k (i<k), the eNB can transmit the PHICH at the $i^{th}$ subframe and the PDCCH at the $k^{th}$ subframe. After receiving the PHICH transmitted by the eNB at the $i^{th}$ subframe of the first cell and the PDCCH transmitted by the eNB at $k^{th}$ subframe, the UE can perform transmission (or retransmission) to the eNB at the second subframe, according to the information carried in the PHICH and/or the PDCCH. The UE also can receive the PHICH transmitted by the eNB at the $i^{th}$ subframe. When there is no PDCCH transmitted by the eNB at the $k^{th}$ subframe, the UE can determine whether to retransmit the data based on the HARQ acknowledgement.

Also, when i is less than k (i<k), the eNB can transmit the PHICH and/or the PDCCH at the $i^{th}$ subframe. Also, the eNB can transmit the PHICH and/or the PDCCH at $k^{th}$ subframe. Specifically, the eNB and the UE can determine or configure one of the $i^{th}$ and $k^{th}$ subframes as the time duration for transmitting PHICH and/or PDCCH. After receiving the PHICH and/or the PDCCH transmitted by the eNB at $i^{th}$ subframe (or the $k^{th}$ subframe) of the first cell, the UE can transmit (or retransmit) data to the eNB according to the PHICH and/or the PDCCH at the second subframe of the second cell.

A description is made of the timing relationship among the PDCCH, the PUSCH, and the PHICH when the TDD uplink-downlink configurations of the aggregated component carriers are different from each other and the cross-carrier is applied, and if the PHICH transmission timing calculated as described is earlier than the PDCCH transmission timing, i.e., i<k.

Figure 5:
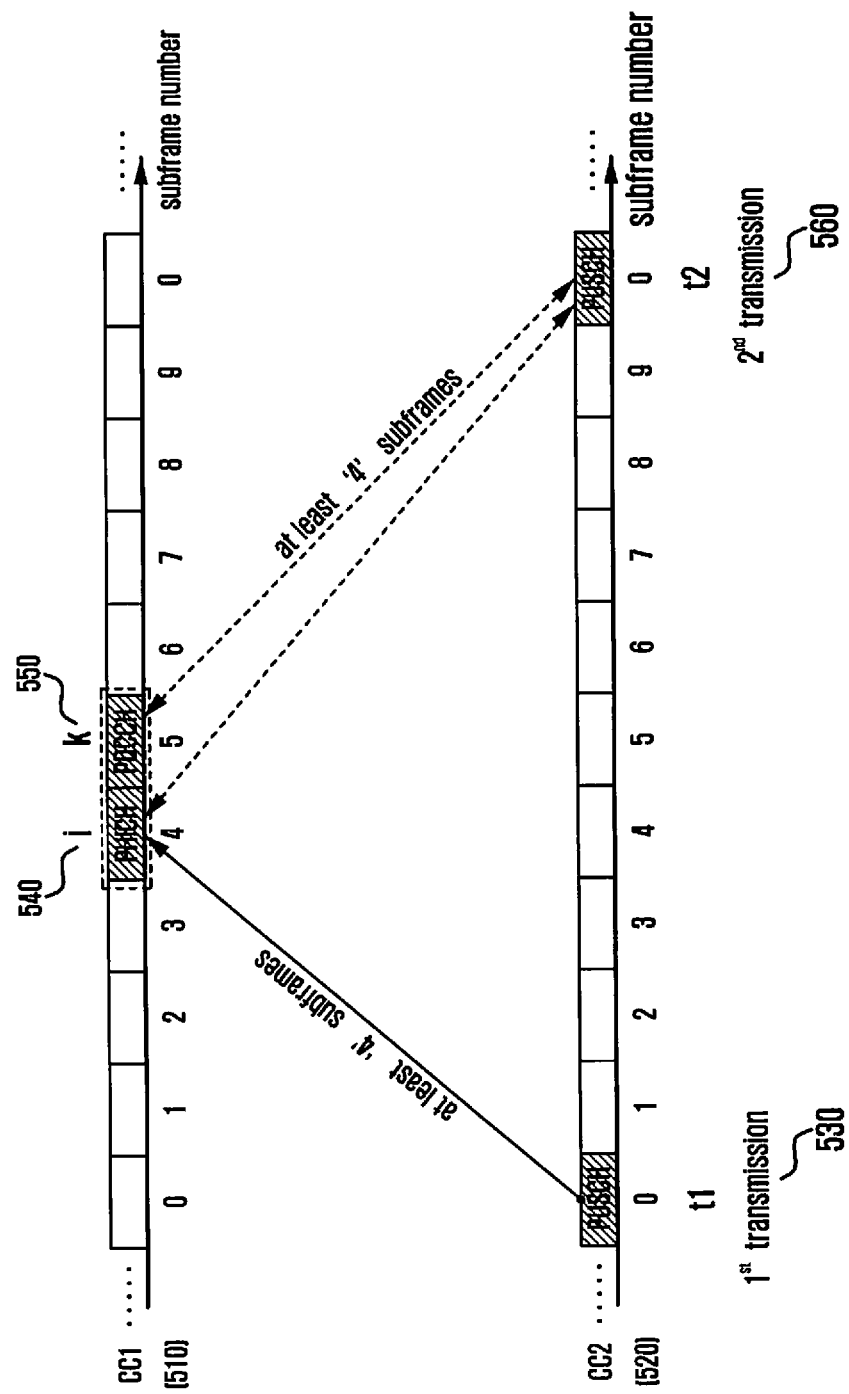
FIG. 5 is a diagram illustrating a Physical HARQ Indicator CHannel (PHICH) and/or a PDCCH transmission/reception timing relationship under a condition of i<k, according to an embodiment of the present invention.
Figure 6:
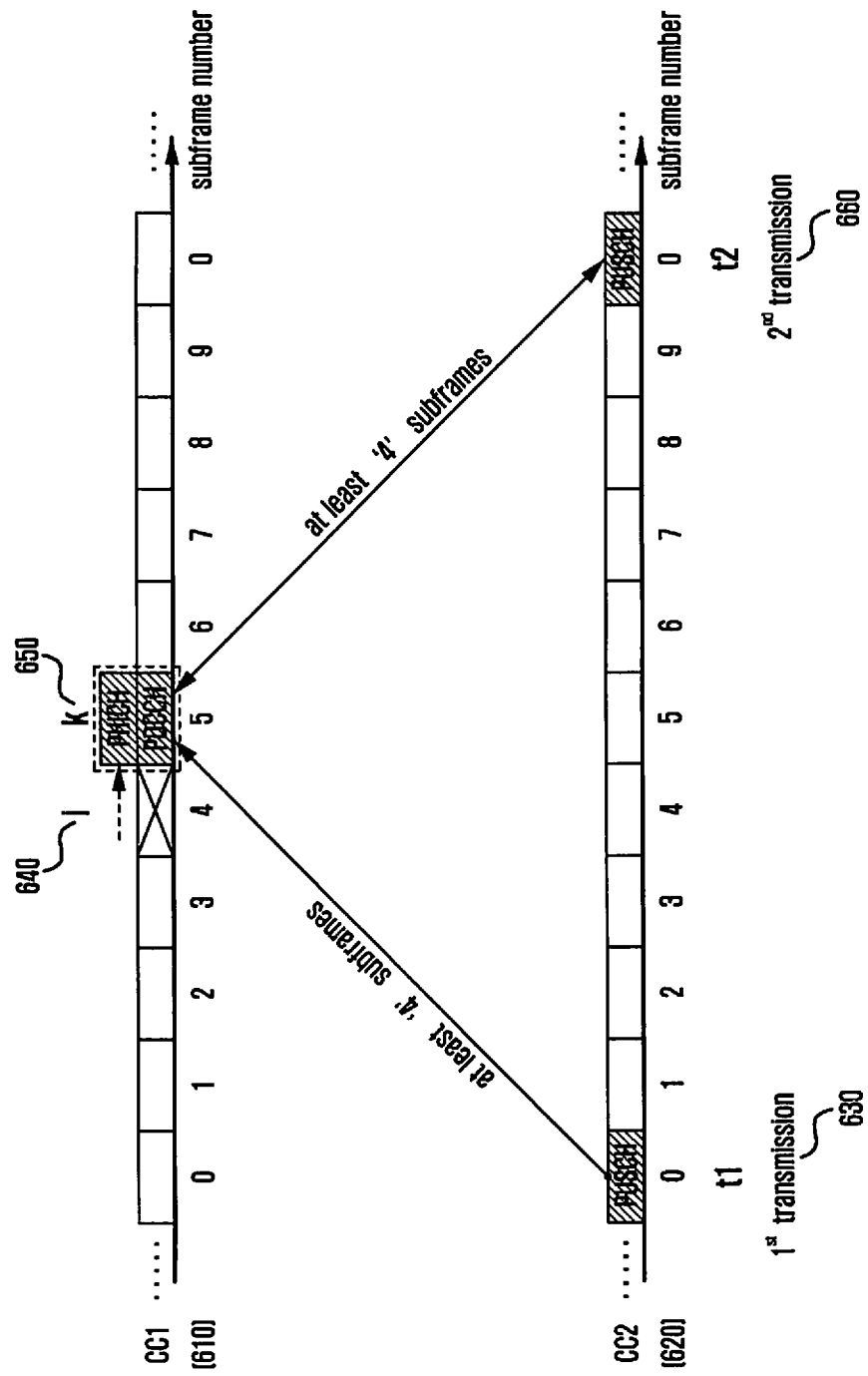
FIG. 6 is a diagram illustrating the PHICH and/or the PDCCH transmission/reception timing relationship under the condition of i<k, according to another embodiment of the present invention.

FIGS. 5 and 6 are diagrams illustrating a timing relationship in case that the relationship between the calculated $i^{th}$ subframe carrying the PHICH and $k^{th}$ subframe carrying the PDCCH for scheduling PUSCH retransmission is i<k, according to an embodiment of the present invention.

In FIG. 5, the first component carrier on which the PDCCH or the PHICH is transmitted for cross-carrier scheduling is CC1 510, and the second component carrier on which the PUSCH cross-carrier scheduled by the PUSCH is CC2 520. Assuming that the initial transmission timing of UE's PUSCH is a $0^{th}$ subframe (t1) 530 in case of operating in a synchronous HARQ mode having fixed data transmission timing, the PUSCH retransmission timing can be a $0^{th}$ subframe (t2) 560 of the next radio frame. In the case of synchronous HARQ, the PUSCH initial transmission/retransmission can be performed at the same frame of different radio frames.

If the UE performs initial transmission of the PUSCH at the subframe corresponding to t1 530 on the CC2 520 according to the scheduling of the eNB, the eNB can transmit PHICH carrying an ACK/NACK corresponding to the PUSCH at the $i^{th}$ subframe 540, i.e., downlink subframe, on the CC1 510. Here, i can be the greatest value satisfying the relationship of k<t2−j. For example, an $i^{th}$ subframe 540 and a $k^{th}$ subframe 550 have the relationship of i≠k, such that the PHICH and the PDCCH transmission timings differ from each other, they may not determine whether to perform PUSCH retransmission at the $i^{th}$ subframe 540 carrying the PHICH, but wait to receive the PDCCH at the $k^{th}$ subframe 550 for preparing adaptive retransmission.

According to an embodiment of the present invention, the PHICH transmission timing and the PDCCH transmission timing can be identical with each other. By transmitting the PHICH and the PDCCH at the same time, it is possible to solve the ambiguity of the UE's retransmission and inefficiency caused by monitoring an extra signal.

For example, the eNB can adjust the $i^{th}$ subframe 540 as an eNB's PHICH transmission timing so as to be equal to the $k^{th}$ subframe 550, i.e. i=k, resulting the simultaneous transmission of the PHICH and the PDCCH for adaptive retransmission. When the eNB and the UE have agreed with each other to shift the position i to position k, the UE can discriminate between the PHICH and the PDCCH transmission timings.

In FIG. 6, the first component carrier on which the PDCCH for cross-carrier scheduling or the PHICH is transmitted is CC1 610, and the second component carrier on which the PUSCH cross-carrier scheduled by the PDCCH is CC2 620. Assuming the UE's PUSCH initial transmission timing is a $0^{th}$ subframe (t1) 630 when using a synchronous HARQ having the fixed data transmission timing in the uplink HARQ, the PUSCH retransmission timing can be a $0^{th}$ subframe (t) 660 of the next radio frame. In the same condition as that of FIG. 5, the eNB can adjust the PHICH transmission timing from an $i^{th}$ subframe 640 to a $k^{th}$ subframe 650.

A description is provided below of the signal transmission/reception timings of the eNB and the UE supporting HARQ, according to an embodiment of the present invention, with reference to FIGS. 7 and 8.

Figure 7:
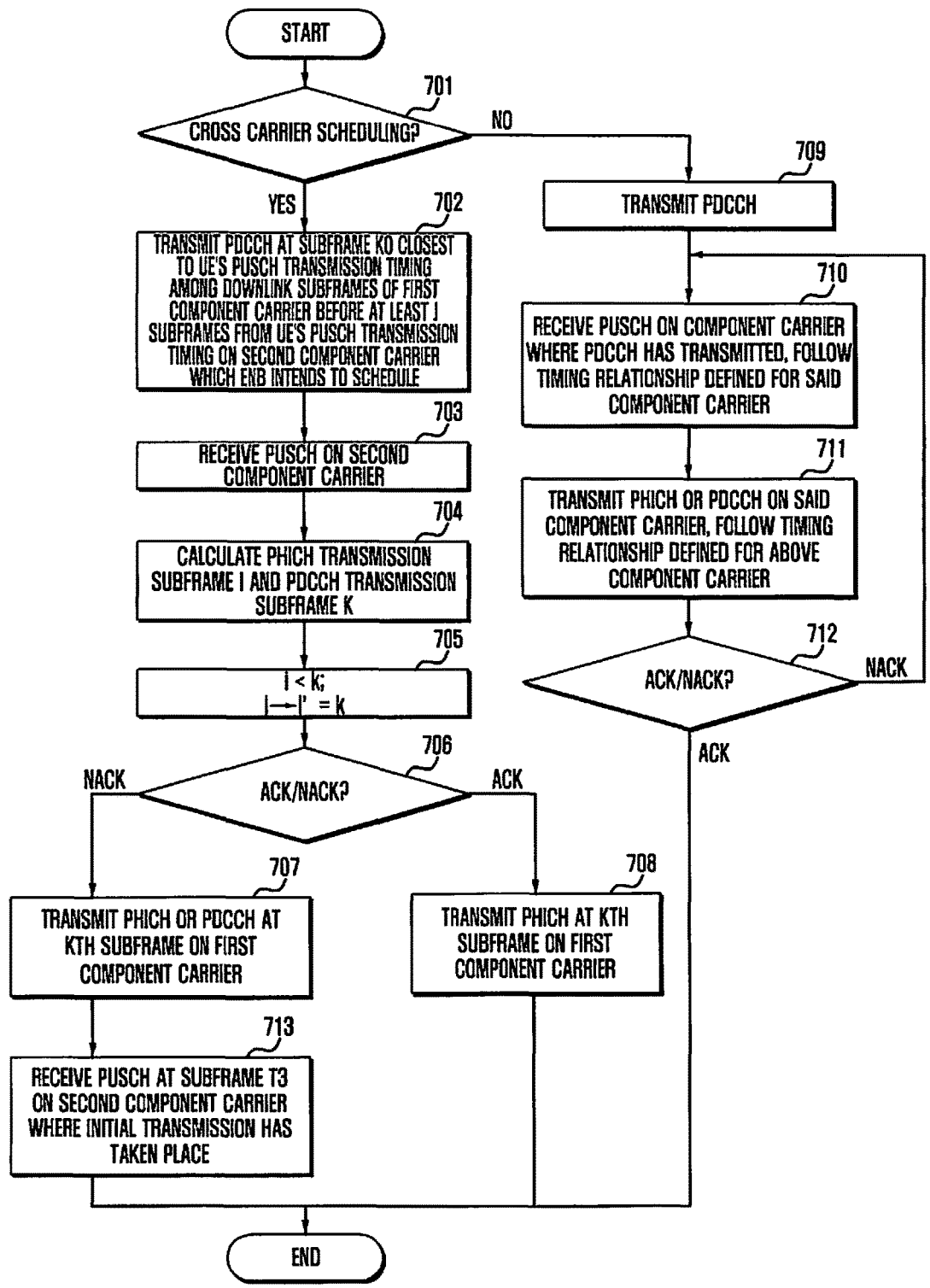
FIG. 7 is a flowchart illustrating an eNB procedure in the HARQ method, according to an embodiment of the present invention.

FIG. 7 is a flowchart illustrating an eNB procedure in the HARQ method, according to an embodiment of the present invention.

The eNB determines whether cross-carrier scheduling is enabled at certain timing, in step 701. If the cross-carrier scheduling is not enabled, e.g., the PDCCH for scheduling PUSCH to be transmitted on the first component carrier is transmitted on the first component carrier too, the eNB can transmit the PDCCH carrying the DCI for scheduling the PUSCH to the UE, in step 709.

The eNB can receive the PUSCH at the PUSCH reception timing defined in the legacy communication standard (e.g., LTE/LTE-A) through the component carrier on which the PDCCH has been transmitted, in step 710.

The eNB can transmit the PHICH or the PDCCH for adaptive retransmission based on the PUSCH decoding result according to the timing defined in the legacy system, in step 711.

The eNB can determine an ACK/NACK according to the decoding result of the received PUSCH, in step 712. If the PUSCH decoding result indicates an ACK, the eNB can schedule new data or end the procedure. If the PUSCH decoding result indicates a NACK, the eNB can receive the PUSCH retransmission by returning to step 710.

If the cross-carrier scheduling is enabled at step 701, the eNB can transmit the PDCCH at a subframe k0 closest to the UE's PUSCH transmission timing among the downlink subframes on the first component carrier before at least j subframes from the UE's transmission timing t1 of the PUCCH on the second component carrier (here, k0≤t1−j), in step 702. j can be set to a value that secures a smallest signal processing time of the UE. For example, j can be set to 4 (j=4).

The eNB can receive the PUSCH on the second component carrier at the scheduling timing considered in transmitting the PDCCH for scheduling initial transmission or retransmission of the PUSCH, in step 703.

The eNB can determine an $i^{th}$ subframe carrying the PHICH corresponding to the PUSCH and a $k^{th}$ subframe carrying the PDCCH for scheduling adaptive retransmission of PUSCH, in step 704. The PHICH transmission timing can be the $i^{th}$ subframe (downlink subframe) arriving first (earliest) after at least j subframes from the subframe carrying the PUSCH on the first component carrier (here, i≥t1+j). Also, the transmission timing of the PDCCH for scheduling adaptive retransmission can be the $k^{th}$ subframe closest (latest) to the UE's PUSCH retransmission timing among the downlink subframes on the first component carrier before at least j subframes from the UE's PUSCH retransmission timing t2 (here, k<t2−j).

If i<k, the eNB can shift the actual PHICH transmission timing from the $i^{th}$ subframe to $I'^{th}$ subframe (I'=k) to match the transmission timings of the PHICH and the PDCCH for adaptive retransmission, in step 705.

The eNB can determine whether the PUSCH decoding result indicates an ACK or a NACK, in step 706. If the PUSCH decoding result indicates an ACK, the eNB can transmit the PHICH at the $k^{th}$ subframe on the first component carrier, in step 708.

If the PUSCH decoding result indicates a NACK, the eNB can transmit the PDCCH for scheduling the PHICH and/or adaptive retransmission at subframe k on the first component carrier, in step 707.

The eNB can receive the PUSCH retransmission at subframe t2 on the second component carrier on which the initial transmission has taken place, in step 713.

Figure 8:
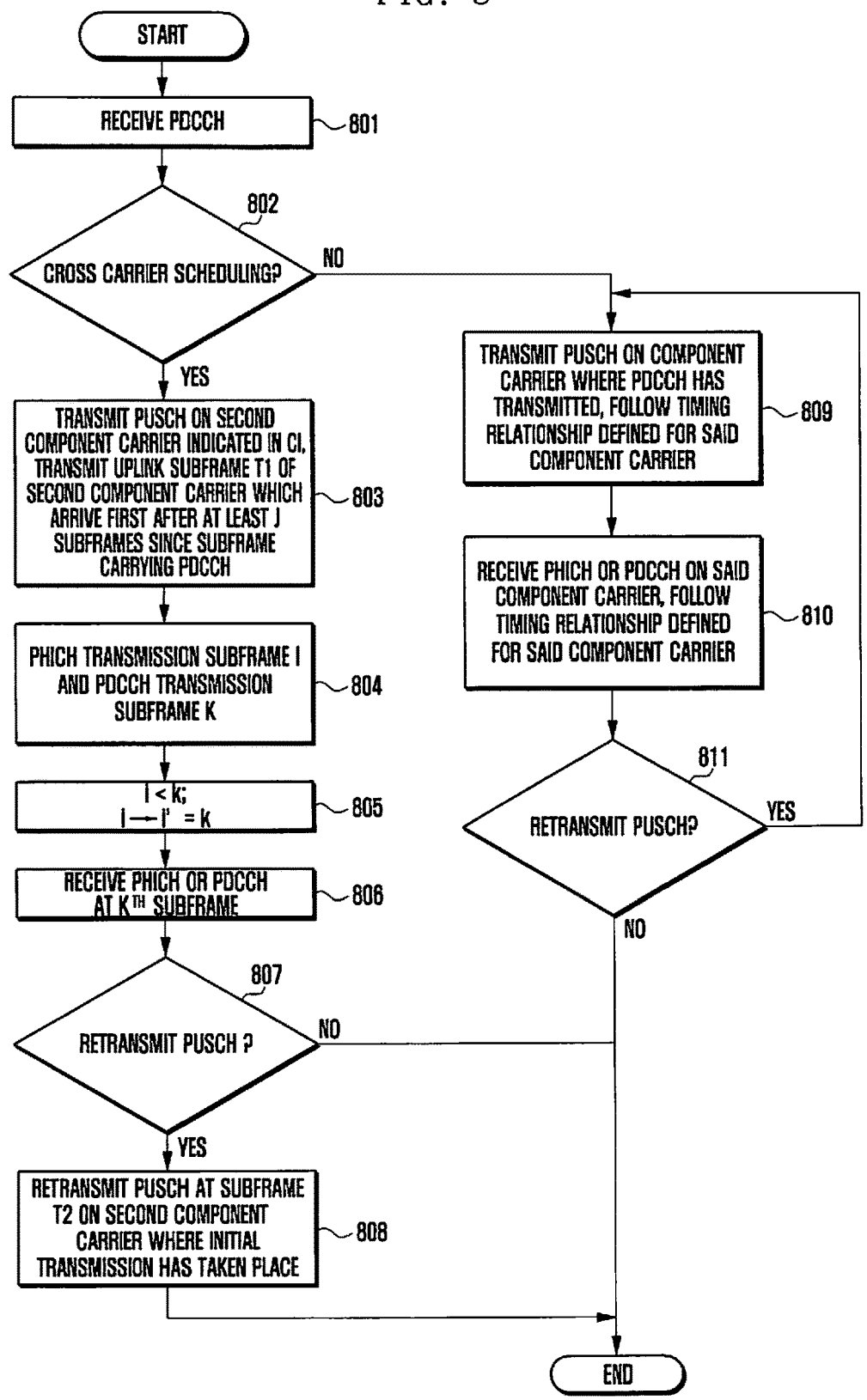
FIG. 8 is a flowchart illustrating a UE procedure in the HARQ method, according to an embodiment of the present invention.

FIG. 8 is a flowchart illustrating a UE procedure in the HARQ method, according to an embodiment of the present invention.

The UE receives PDCCH from the eNB, in step 801.

The UE decodes the received PDCCH and determines whether the cross-carrier scheduling is enabled, in step 802. If the cross-carrier scheduling is disabled, the UE transmits the PUSCH to the eNB on the component carrier on which the PDCCH has been transmitted, in step 809. PUSCH transmission timing can follow the timing relationship between the PDCCH and the PUSCH, which is defined on the component carrier in the legacy standard (e.g., LTE/LTE-A).

The UE can receive the PHICH and/or the PDCCH through the component carrier on which the PUSCH has been transmitted, according to the timing relationship among the PUSCH, the PHICH, and the PDCCH that is defined in the legacy standard, in step 810.

The UE determines whether to perform retransmission of the PUSCH based on the information carried in the PHICH and/or the PDCCH, in step 811. If it is determined to perform retransmission of the PUSCH, the procedure returns to step 809. If it is determined not to perform retransmission of the PUSCH, the UE may end the operation for supporting HARQ according to an aspect of an embodiment.

If the cross-carrier scheduling is enabled at step 802, the UE can transmit the PUSCH on the second component carrier indicated by the carrier indicator, in step 803. Specifically, the UE can transmit the PUSCH at the uplink subframe t1 appearing first after j subframes since the subframe carrying the PDCCH. j can be set to a value that guarantees the least signal processing time of the UE (e.g., j=4).

The UE can determine the $i^{th}$ subframe carrying the PHICH corresponding to the PUSCH and the $k^{th}$ subframe carrying the PDCCH for scheduling adaptive retransmission of PUSCH on the first component carrier, in step 804. The PHICH transmission timing can be the $i^{th}$ subframe (downlink subframe) arriving first on the first component carrier, after at least j subframes since the subframe carrying the PUSCH (here, i≥t1+j). Also, the PDCCH transmission timing for scheduling adaptive retransmission can be the $k^{th}$ subframe closest to the UE's PUSCH retransmission timing among the downlink subframes on the first component carrier before at least j subframes from the UE's PUSCH retransmission timing (t2) (here, k≤t2−j).

If i<k, the UE can be aware that the eNB's PHICH transmission timing is adjusted from $i^{th}$ subframe to $I'^{th}$ subframe (I'=k), such that the transmission timings of the PHICH and/or PDCCH for adaptive retransmission match with each other, in step 805.

The UE can receive the PHICH and/or the PDCCH at $k^{th}$ subframe, in step 806.

The UE determines whether to retransmit the PUSCH based on the information carried in the received PHICH and/or the PDCCH, in step 807. If it is determined not to retransmit the PUSCH, the UE can end the operation for supporting HARQ, according to an embodiment of the present invention.

If it is determined to retransmit the PUSCH, the UE can retransmit the PUSCH at the subframe t2 on the second component carrier where the initial transmission has taken place, in step 808.

Figure 9:
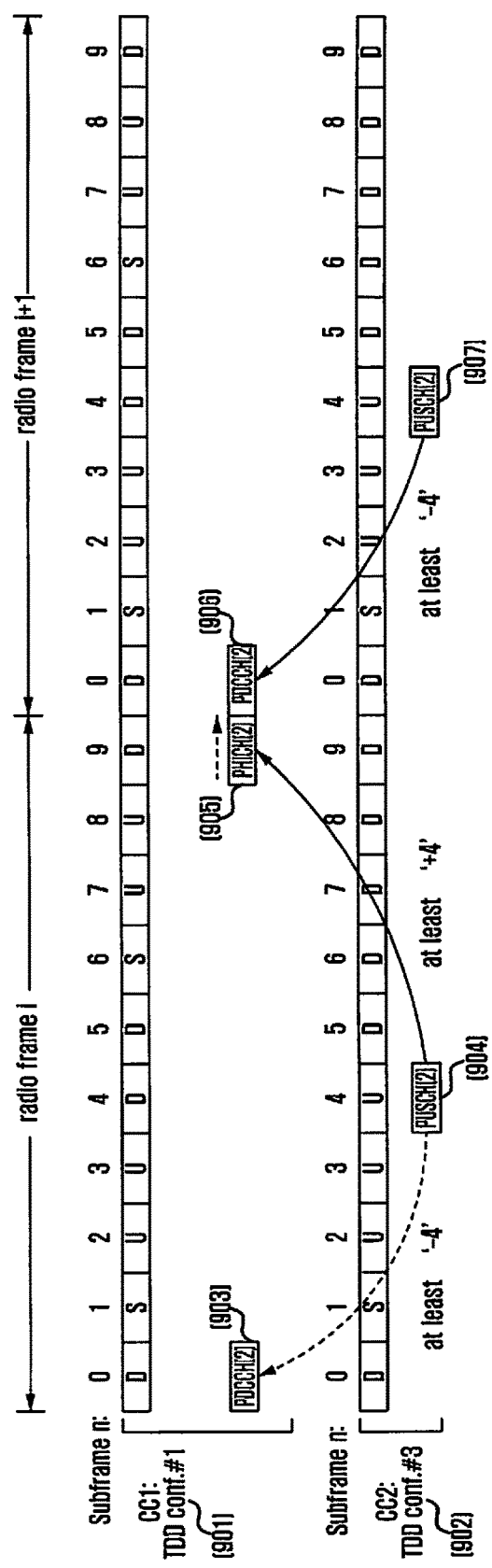
FIG. 9 is a diagram illustrating the PHICH and/or the PDCCH transmission/reception timing relationship under the condition of i<k, according to another embodiment of the present invention.

FIG. 9 is a diagram illustrating the PHICH and/or the PDCCH transmission/reception timing relationship under condition of i<k, according to an embodiment of the present invention. FIG. 9 shows the transmission/reception timings of the signals in the TDD system configured with two component carriers aggregated, i.e., a component carrier CC1 901 operating in TDD uplink-downlink configuration #1 and a component carrier CC2 902 operating in TDD uplink-downlink configuration #2. Although FIG. 9 is directed to the case where the radio frame timings of the CC1 901 and the CC2 902 are matched with each other, the eNB and/or the UE supporting the HARQ can operate with different radio frame timings, according to an embodiment of the present invention.

In FIG. 9, it can be assumed that the CC1 901 is the first component carrier on which the PDCCH for cross-carrier scheduling the PUSCH to be transmitted on the CC2 902 is transmitted. When the eNB intends to schedule the initial transmission of the PUSCH at the fourth subframe 904 of the $i^{th}$ radio frame on the CC2 902, the eNB can transmit the PDCCH at the $0^{th}$ subframe 903 of the $i^{th}$ radio frame as the downlink subframe arriving first (earliest) before at least 4 subframes from the PUSCH transmission timing on the CC1 902. The available eNB's transmission timing of the PHICH corresponding to the PUSCH can be a $9^{th}$ subframe 905 of the $i^{th}$ radio frame as the earliest downlink frame after at least 4 subframes since the UE's PUSCH transmission timing on the CC1 901. According to the synchronous HARQ retransmission timing relationship of the CC2 902 when the PUSCH retransmission takes place, the UE's PUSCH retransmission timing can be a $4^{th}$ subframe 907 of the $(i+1)^{th}$ radio frame. In case of the PDCCH for scheduling adaptive retransmission of the PUSCH, the available PDCCH transmission timing can be the $0^{th}$ subframe of $(i+1)^{th}$ radio frame as the downlink subframe closest (latest) to the UE's PUSCH retransmission timing before at least 4 subframes from the PUSCH retransmission timing on the CC1 901.

As described with reference to FIGS. 5 to 8, the eNB can match the available PHICH transmission timing 905 with an available PDCCH transmission timing to determine the PHICH and/or the PDCCH transmission timing at a $0^{th}$ subframe 906 of the $(i+1)^{th}$ radio frame.

Figure 10:
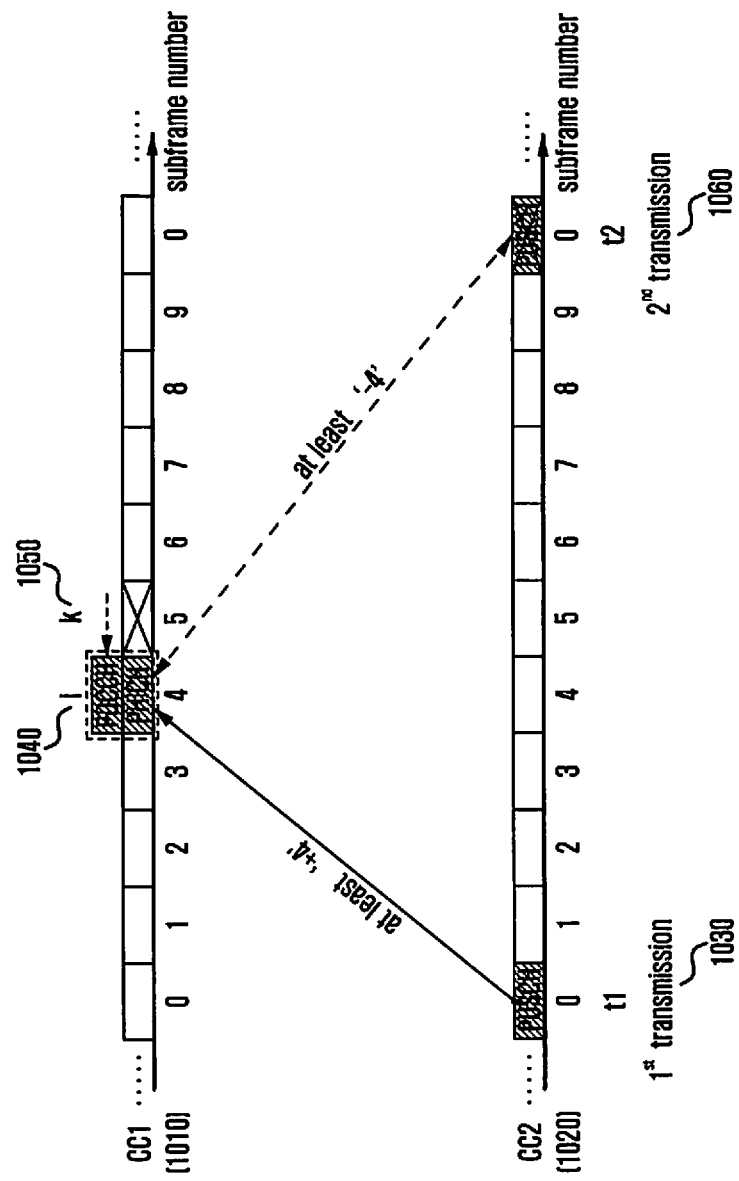
FIG. 10 is a diagram illustrating the PHICH and/or the PDCCH transmission/reception timing relationship under condition of i<k, according to another aspect of the present invention.

The PHICH and/or the PDCCH transmission/reception timings, according to an embodiment of the present invention, can be modified in various forms. For example, the eNB can adjust the PDCCH transmission timing for adaptive retransmission from the $k^{th}$ subframe calculated as described with reference to FIG. 5 to subframe k' (k'=i), such that the PHICH transmission timing and the PDCCH transmission timing for adaptive retransmission match with each other. In FIG. 10, the PDCCH transmission timing is adjusted to an $i^{th}$ subframe 1040, but not a $k^{th}$ subframe 1050, under the same condition as FIG. 5. In FIG. 10, the PDCCH for cross-carrier scheduling or the PHICH is transmitted on a first component carrier CC1 1010, and the PUSCH cross-scheduled by the PDCCH is transmitted on a second component carrier CC2 1020. When the initial PUSCH transmission timing is a $0^{th}$ subframe (t1) 1030 in the system using a synchronous HARQ having the fixed data transmission timing in uplink, the PUSCH retransmission timing can be a $0^{th}$ subframe (t2) 1060 of the next radio frame.

The eNB can use the $i^{th}$ subframe as PHICH transmission timing, and the $k^{th}$ subframe as PDCCH transmission timing calculated in the embodiment of FIG. 5 can be used as the actual PHICH and PDCCH transmission timings. A detailed description of the UE procedure is provided below with reference to FIG. 11.

Figure 11:
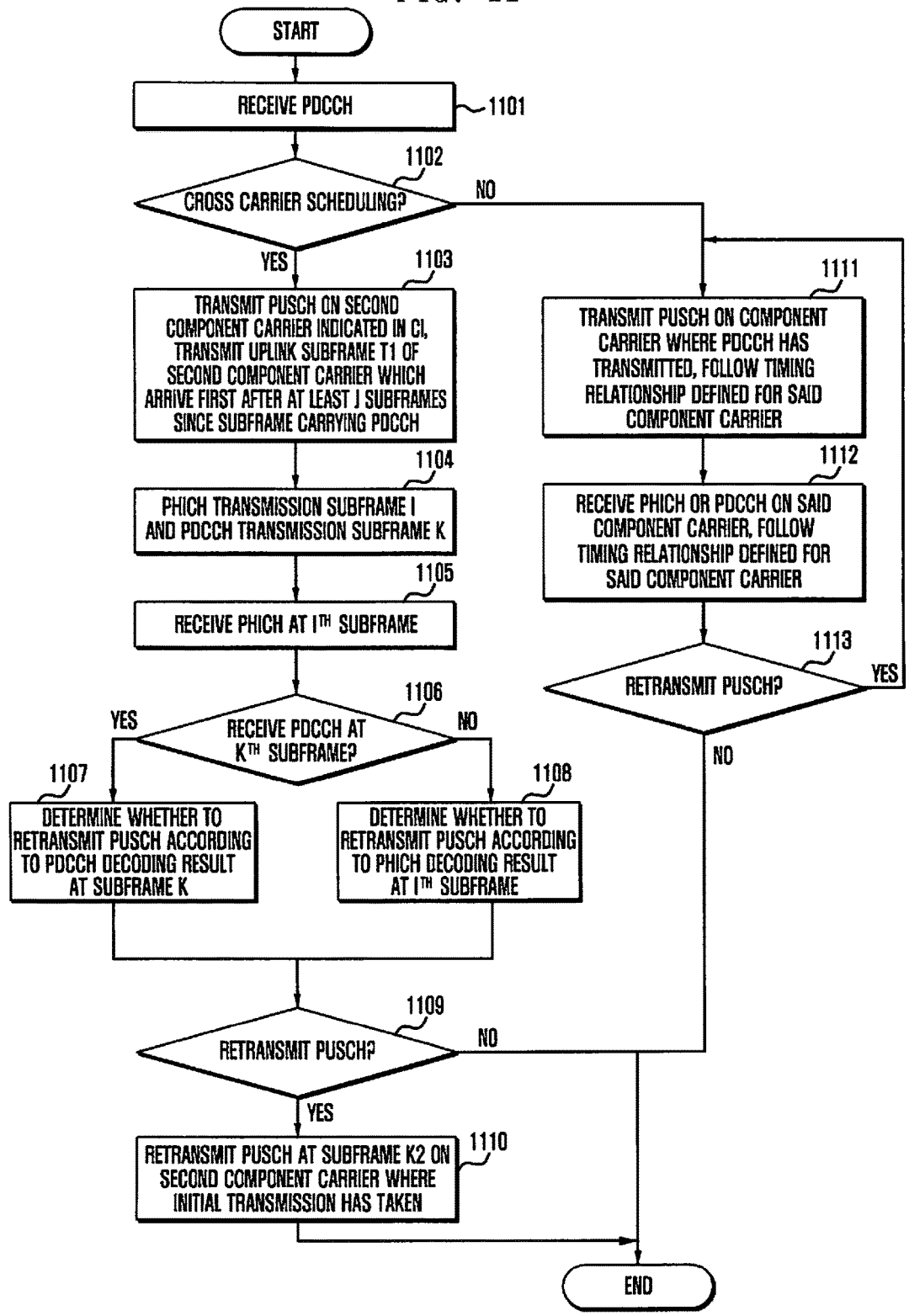
FIG. 11 is a flowchart illustrating a UE procedure in the HARQ method, according to another embodiment of the present invention.

FIG. 11 is a flowchart illustrating a UE procedure in the HARQ method, according to another embodiment of the present invention.

Steps 1101 to 1104 of FIG. 11 are substantially identical with steps 801 to 804 of FIG. 8, described in detail above. Also, steps 1111 to 1113 are substantially identical with steps 809 to 811 of FIG. 8, described in detail above.

The UE can receive the PHICH at the $i^{th}$ subframe, in step 1105.

The UE determines whether the PDCCH is received at the $k^{th}$ subframe, in step 1106. If the PDCCH is received at step 1106, the UE determines whether to perform the PUSCH retransmission according to the PDCCH decoding result at the $k^{th}$ subframe, in step 1107. If the PDCCH is not received at step 1106, the UE determines whether to perform the PUSCH retransmission according to the PHICH decoding result at the $i^{th}$ subframe, in step 1108. The UE determines whether to perform the PUSCH retransmission in step 1109, according to the determination result at step 1107 and/or 1108. Step 1110 is substantially identical with step 808 of FIG. 8, described in detail above.

When the index i of the subframe available for the HARQ acknowledgement transmission is greater than the index k of the subframe available for scheduling information transmission (i.e., i>k), the eNB can transmit the PHICH and/or the PDCCH at the $i^{th}$ subframe. After receiving the PHICH and/or the PDCCH transmitted by the eNB at the $i^{th}$ subframe of the first cell, the UE can transmit (or retransmit) data (e.g., the PUSCH) to the eNB in correspondence to the PHICH and/or the PDCCH at the third subframe of the second cell. Here, the third subframe can be the earliest time duration available for the UE's data (e.g. the PUSCH) transmission (or retransmission) since the second subframe according to the synchronous HARQ. The second subframe can be the vacant resource carrying no PUSCH or the resource allocated to another UE other than the corresponding UE.

A description is made of the timing relationship among the PDCCH, the PUSCH, and the PHICH when the PHICH transmission timing calculated as described above is later than the transmission timing of the PDCCH for the PUSCH retransmission, i.e. i>k, when the TDD uplink-downlink configurations of aggregated component carriers differ from each other and cross-carrier scheduling is applied in the TDD radio communication configuring broad bandwidth through carrier aggregation, with reference to FIGS. 12 to 17.

Figure 12:
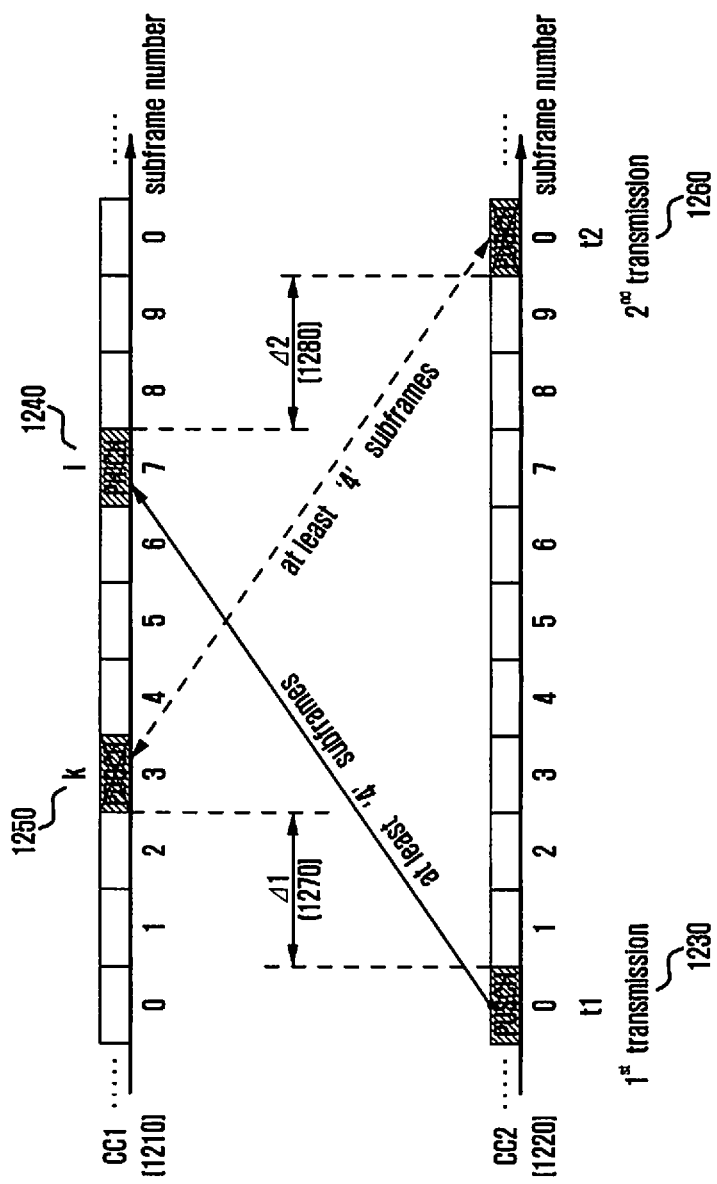
FIG. 12 is a diagram illustrating the timing relationship among the PHICH/PDCCH, and/or a PUSCH under a condition of i>k, according to an embodiment of the present invention.

FIG. 12 is a diagram illustrating the timing relationship in case where the relationship between the $i^{th}$ subframe carrying the PHICH and the $k^{th}$ subframe carrying the PDCCH for scheduling the PUSCH retransmission is i>k. In FIG. 12, the PDCCH for cross-carrier scheduling or the PHICH are transmitted on a first component carrier CC1 1210, and the PUSCH cross-carrier scheduled by the PDCCH is transmitted on a second component carrier CC2 1220. If the UE's initial PUSCH transmission timing is a $0^{th}$ subframe (t1)

1230 in the system operating in the synchronous HARQ having fixed data transmission in uplink, the PUSCH retransmission timing can be a $0^{th}$ subframe (t2) 1260 of the next radio frame. For example, the initial transmission/retransmission of the PUSCH can be performed at the same subframe of different radio frames.

When the UE has performed initial transmission of the PUSCH at the subframe t1 1230 of the CC2 1220 according to the eNB's scheduling, the eNB can transmit the PHICH carrying an ACK or a NACK corresponding to the PUSCH at an $i^{th}$ subframe 1240, as a downlink subframe, of the CC1 1210. Here, i can be the least value satisfying the condition of i>t1+j. If it is determined to transmit a NACK corresponding to the PUSCH and apply adaptive retransmission, the eNB can transmit the PDCCH, at a $k^{th}$ subframe 1250 of the CC1 1210, for scheduling the PUSCH retransmission at the subframe t2 1260 of CC2 1220. Here, k is the greatest value satisfying the condition k<t−j.

The time duration secured until the PUSCH retransmission at the t2 1260 after receiving the PHICH at the $i^{th}$ subframe 1240 is Δ2 subframes 1280, the UE's signal processing time shortage may take place. Although it is necessary to secure enough time for the PUSCH initial transmission at the $0^{th}$ subframe (t1) 1230 in order for the eNB to transmit the PDCCH for scheduling adaptive retransmission at the $k^{th}$ subframe 1250, the time secure actually is Δ1 subframe 1270, resulting in signal processing time shortage of the eNB.

The eNB, according to an embodiment of the present invention, can adjust the eNB's PDCCH transmission timing from the $k^{th}$ subframe to the $k'^{th}$ subframe (k'=i) so as to match the transmission timings of the PHICH and the PDCCH for adaptive retransmission with each other. The eNB also can adjust the PUSCH retransmission timing from the subframe t2 1260 to the subframe t3 as the next retransmission timing.

Figure 13:
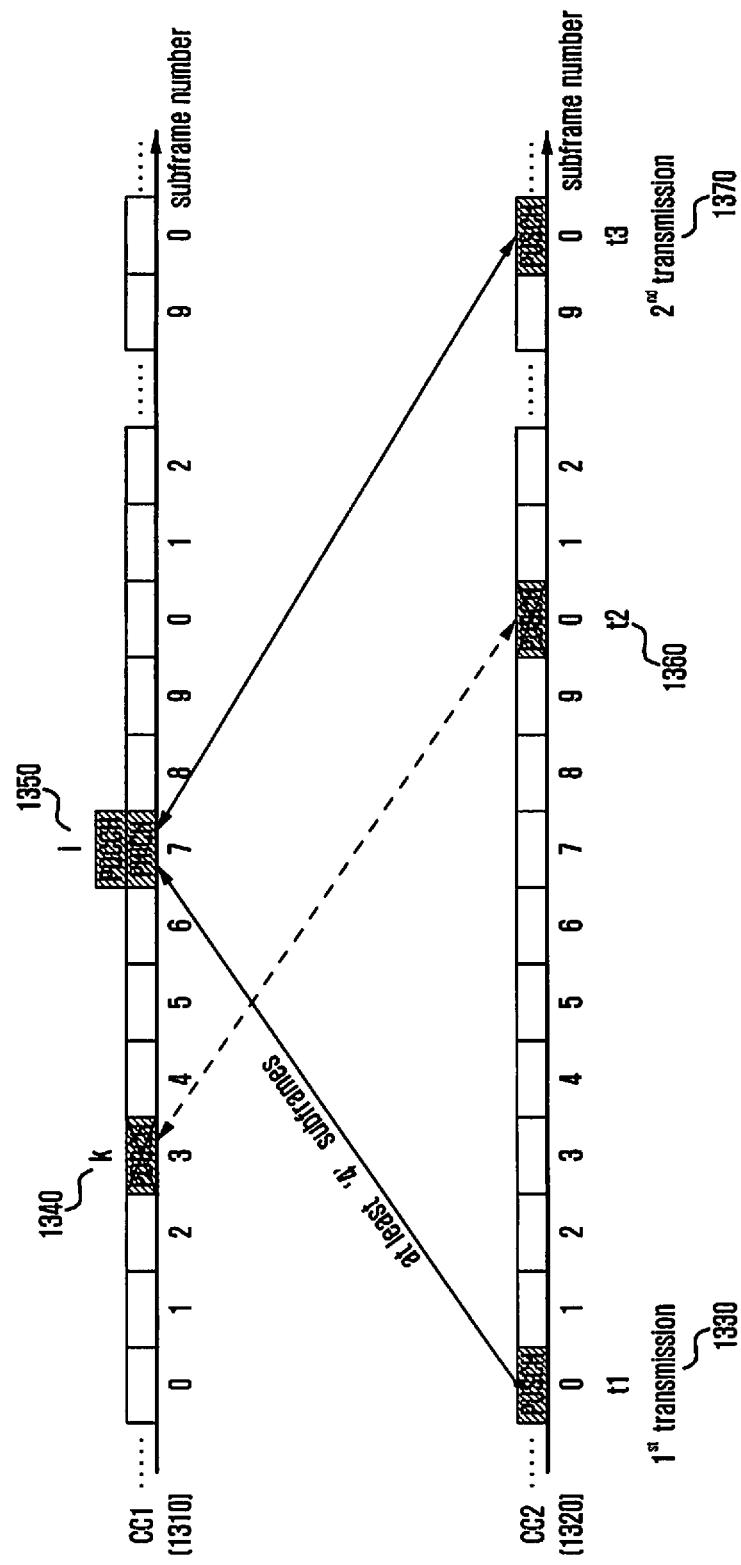
FIG. 13 is a diagram illustrating the timing relationship among the PHICH/PDCCH, and/or the PUSCH under the condition of i>k, according to another embodiment of the present invention.

FIG. 13 shows a case where the eNB's PDCCH transmission timing is adjusted to an $i^{th}$ subframe 1350 other than a $k^{th}$ subframe 1340 under the same condition as the embodiment of FIG. 12. In FIG. 13, the PDCCH for cross-carrier scheduling or the PHICH is transmitted on a first component carrier CC1 1310, and the PUSCH cross-carrier scheduled by the PDCCH is transmitted on a second component carrier CC2 1320. The PUSCH retransmission timing corresponding to an initial PUSCH transmission timing 1330 can be adjusted from a subframe t2 1360 to a subframe t3 1370. If generalizing the initial transmission or retransmission timing of the PUSCH as t1 1330, t2 1360, and t3 1370, t1 1330 corresponds to the nth subframe of the $m^{th}$ radio frame, t2 1360 corresponds to the nth subframe of the $(m+1)^{th}$ radio frame, and t3 corresponds to the nth subframe of the $(m+2)^{th}$ radio frame.

A description is provided below of the signal transmission/reception timings of the eNB and the UE supporting HARQ according to an embodiment of the present invention, with reference to FIGS. 14 and 15.

Figure 14:
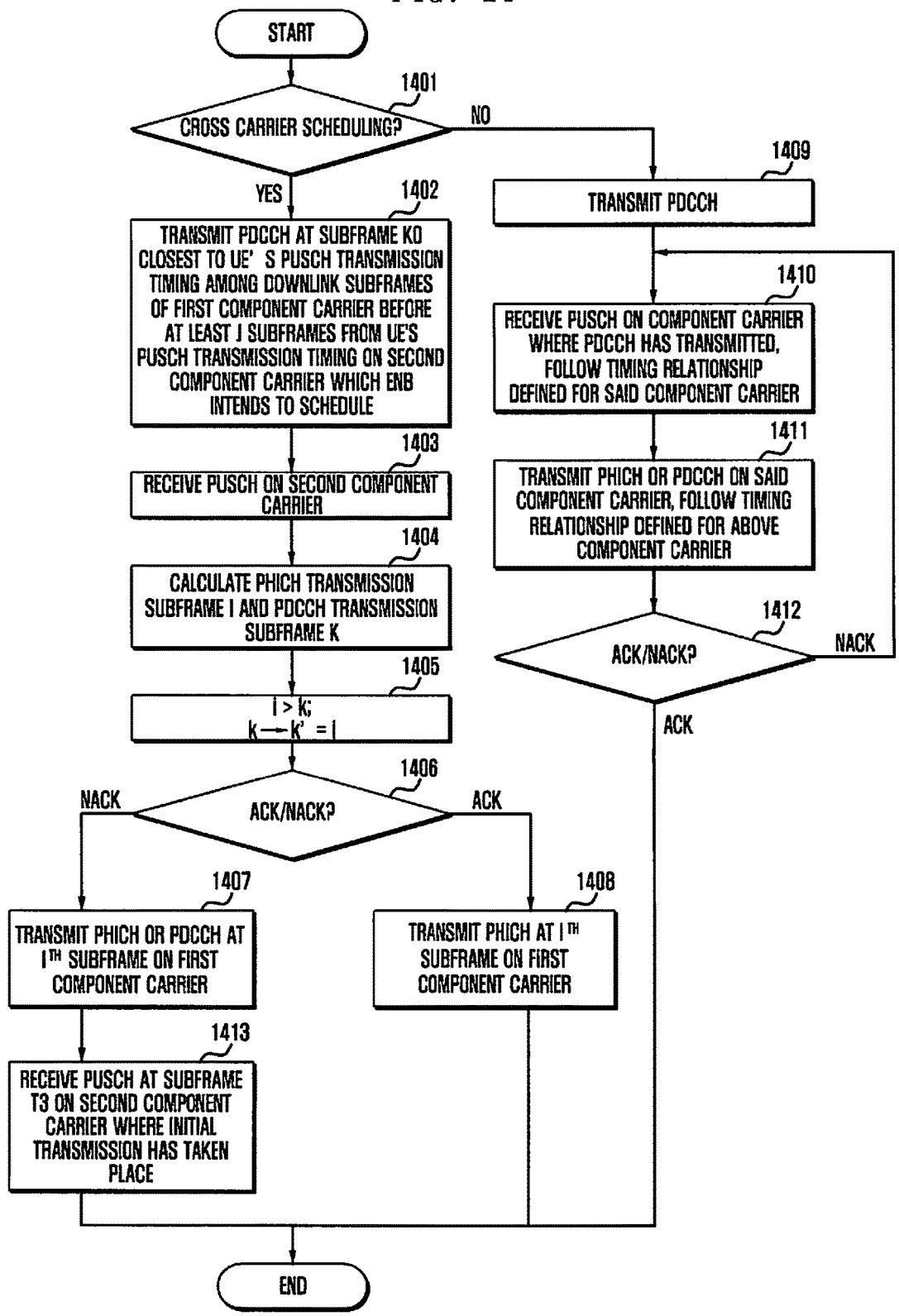
FIG. 14 is a flowchart illustrating an eNB procedure in the HARQ method, according to an embodiment of the present invention.

FIG. 14 is a flowchart illustrating an eNB procedure in the HARQ method, according to an embodiment of the present invention.

Steps 1401 to 1404 of FIG. 14 are substantially identical with steps 701 to 704 of FIG. 7, described in detail above. Also, steps 1409 to 1412 of FIG. 14 are substantially identical with step 709 to 711 of FIG. 7, described in detail above.

If i>k, the eNB adjusts the actual PDCCH transmission timing from the $k^{th}$ subframe to the $k'^{th}$ subframe (k'=i) to match the PHICH and the PDCCH for adaptive retransmission timings to each other, in step 1405.

The eNB can determine whether to transmit an ACK or a NACK according to the PUSCH decoding result, in step 1406. If it is determined to transmit an ACK at step 1406, the eNB transmits the PHICH at the $i^{th}$ subframe of the first component carrier, in step 1408.

If it is determined to transmit a NACK at step 1406, the eNB can transmit the PDCCH for the PHICH and/or the PDCCH for scheduling adaptive retransmission at the $i^{th}$ subframe of the first component carrier, in step 1407.

The eNB can receive the PUSCH retransmission at the subframe t3 of the second component carrier on which the initial transmission of the PUSCH has taken place, in step 1413 (here, t3 is the earliest time duration available for the PUSCH retransmission since t2).

Figure 15:
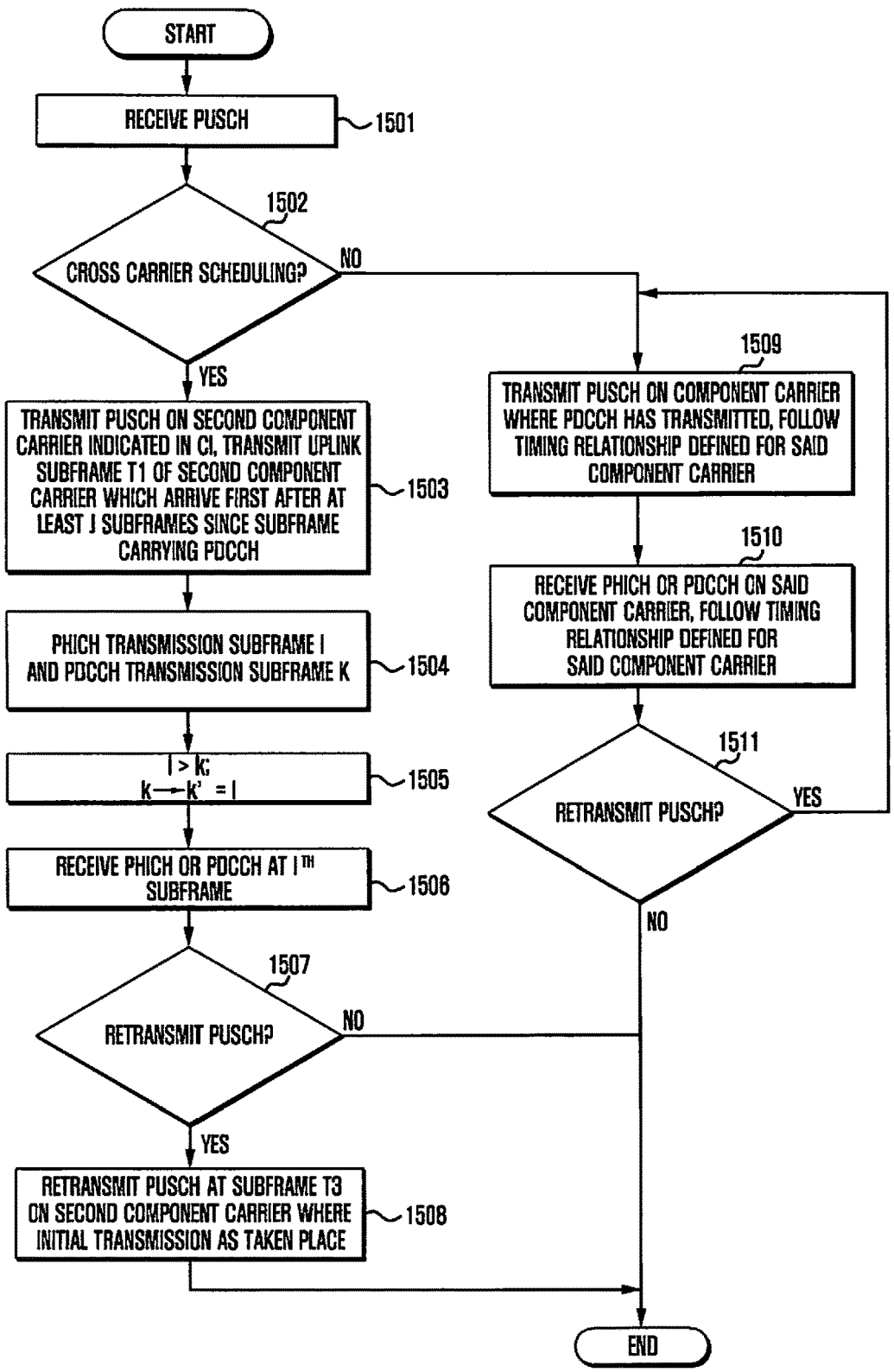
FIG. 15 is a flowchart illustrating a UE procedure in the HARQ method, according to an embodiment of the present invention.

FIG. 15 is a flowchart illustrating a UE procedure in the HARQ method, according to an embodiment of the present invention.

Steps 1501 to 1504 of FIG. 15 are substantially identical with steps 801 to 804 of FIG. 8, described in detail above. Also, steps 1509 to 1511 of FIG. 15 are substantially identical with steps 809 to 811 of FIG. 8, described in detail above.

If i>k, the UE can perceive that the eNB's PDCCH transmission timing is adjusted from the $k^{th}$ subframe to the $k'^{th}$ subframe (k'=i), such that the transmission timings of the PHICH and the PDCCH for adaptive retransmission match each other, in step 1505.

The UE can receive the PHICH and/or the PDCCH at the $i^{th}$ subframe, in step 1506.

The UE determines whether to retransmit the PUSCH based on the information carried by the PHICH and/or the PDCCH, in step 1507. If it is determined not to retransmit the PUSCH at step 1507, the UE can end the operation for supporting HARQ, according to an embodiment of the present invention.

If it is determined to retransmit the PUSCH at step 1507, the UE can retransmit the PUSCH at subframe t3 of the second component carrier on which the initial transmission of the PUSCH has taken place, in step 1508.

Figure 16:
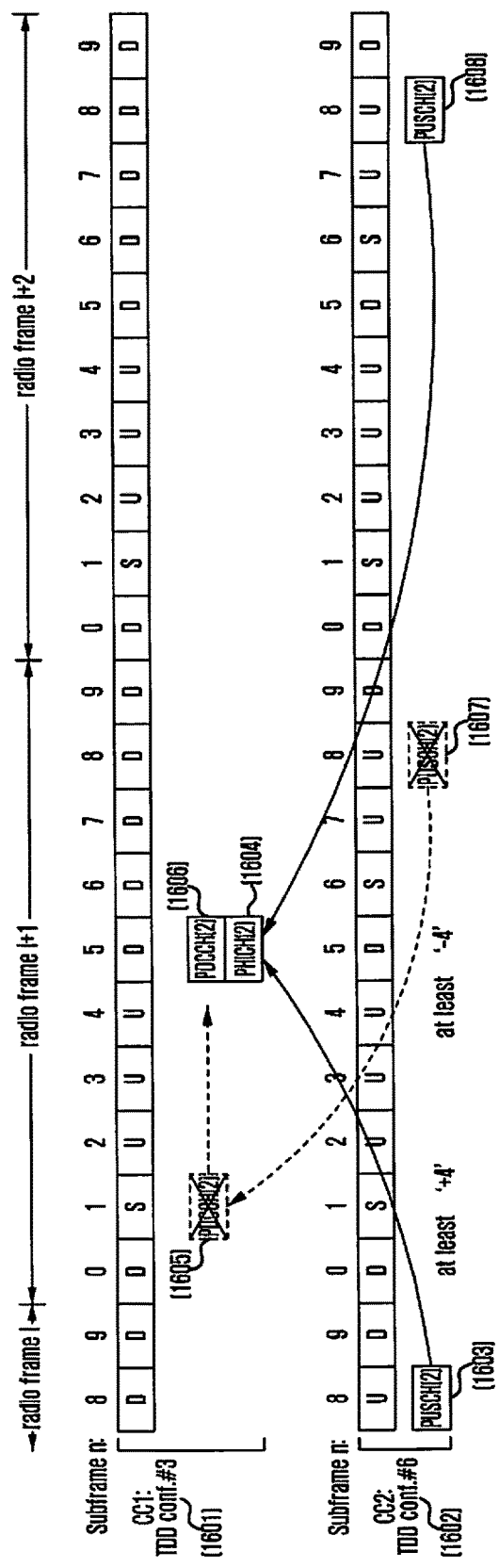
FIG. 16 is a diagram illustrating the transmission/reception timing relationship of the PDCCH and/or the PUSCH under the condition of i>k, according to an embodiment of the present invention.

FIG. 16 is a diagram illustrating the timing relationship of the PDCCH and/or the PDCCH transmission/reception when i>k, according to an embodiment of the present invention. Specifically, FIG. 16 shows signal transmission/reception timings in the TDD system operating two aggregated component carriers, i.e. CC1 1601 in TDD uplink-downlink configuration #3 and CC2 1602 in TDD uplink-downlink configuration #6. Although FIG. 16 is directed to the case where the timings on the CC1 1601 and the CC2 1602 match each other, the eNB and/or UE supporting HARQ can operate in case where the timings on the two component carriers do not match too.

In FIG. 16, the PDCCH for cross-carrier scheduling the PUSCH to be transmitted on the CC2 1602 can be transmitted on the CC1 1601 as the first component carrier. In case that the UE's initial transmission of PUSCH takes place at an $8^{th}$ subframe 1603 of an $i^{th}$ radio frame on the CC2 1602, the first PUSCH retransmission timing can be an $8^{th}$ subframe 1607 of an $(i+1)^{th}$ radio frame, and the second PUSCH retransmission timing can be an $8^{th}$ subframe 1608 of an $(i+2)^{th}$ radio frame. The UE's PHICH transmission timing corresponding to the initial PUSCH transmission can be a $5^{th}$ subframe 1604 of the $(i+1)^{th}$ radio frame as the first (earliest) downlink subframe appearing on the CC1 1601 after at least 4 subframes since the UE's PUSCH transmission timing.

In case of transmitting the PDCCH for scheduling adaptive retransmission of the initial PUSCH transmission, the available PDCCH transmission timing can be a first subframe 1605 of the $(i+1)^{th}$ radio frame as the earliest downlink subframe appearing on the CC1 1601 before at least 4 subframes from the first PUSCH retransmission timing 1607. However, if it fails to secure the signal processing time (e.g. 4 subframes) before configuration of PDCCH after the receipt of the initial PUSCH transmission at the subframe 1603, the eNB cannot transmit the PDCCH transmission. Accordingly, the eNB adjusts the PDCCH transmission timing to the $5^{th}$ subframe of the $(i+1)^{th}$ radio frame to match the PDCCH and the PHICH transmission timing into a subframe 1606.

When the retransmission of the PUSCH takes place, the UE's signal processing time is not enough for the PUSCH retransmission at the $8^{th}$ subframe 1607 of the $(i+1)^{th}$ radio frame so as to fail retransmission at the $8^{th}$ subframe 1607. Accordingly, the UE can retransmit the PUSCH at the $8^{th}$ subframe 1608 of $(i+2)^{th}$ radio frame, which corresponds to the earliest PUSCH retransmission timing since the subframe 1607.

This embodiment of the present invention can be modified in various manners. When i is greater than k (i>k), the eNB can control other UEs—neighbor UEs not using the first subframe—to mute data transmission. Here, the fourth subframe is used in the second cell and earliest uplink time duration since the second subframe. Specifically, the $4^{th}$ subframe can be the closest uplink subframe since the second subframe. The eNB can transmit the PHICH and/or the PDCCH at the $i^{th}$ subframe. After receiving the PHICH and/or the PDCCH transmitted by the eNB at the $i^{th}$ subframe of the first cell, the UE can transmit (or retransmit) data (e.g., PUSCH) to the eNB in correspondence to the PHICH and/or the PDCCH at the $4^{th}$ subframe. At least some subframes (e.g., the $4^{th}$ subframe) of the second cell may not match the uplink data transmission time duration of the synchronous HARQ.

Referring to FIG. 13, the PUSCH retransmission timing for retransmitting the PUSCH transmitted at transmission timing 1330 is not fixed at t3 1370 but can be adjusted to the uplink subframe t3' on the second component carrier 1320 before t3 flexibly.

Figure 17:
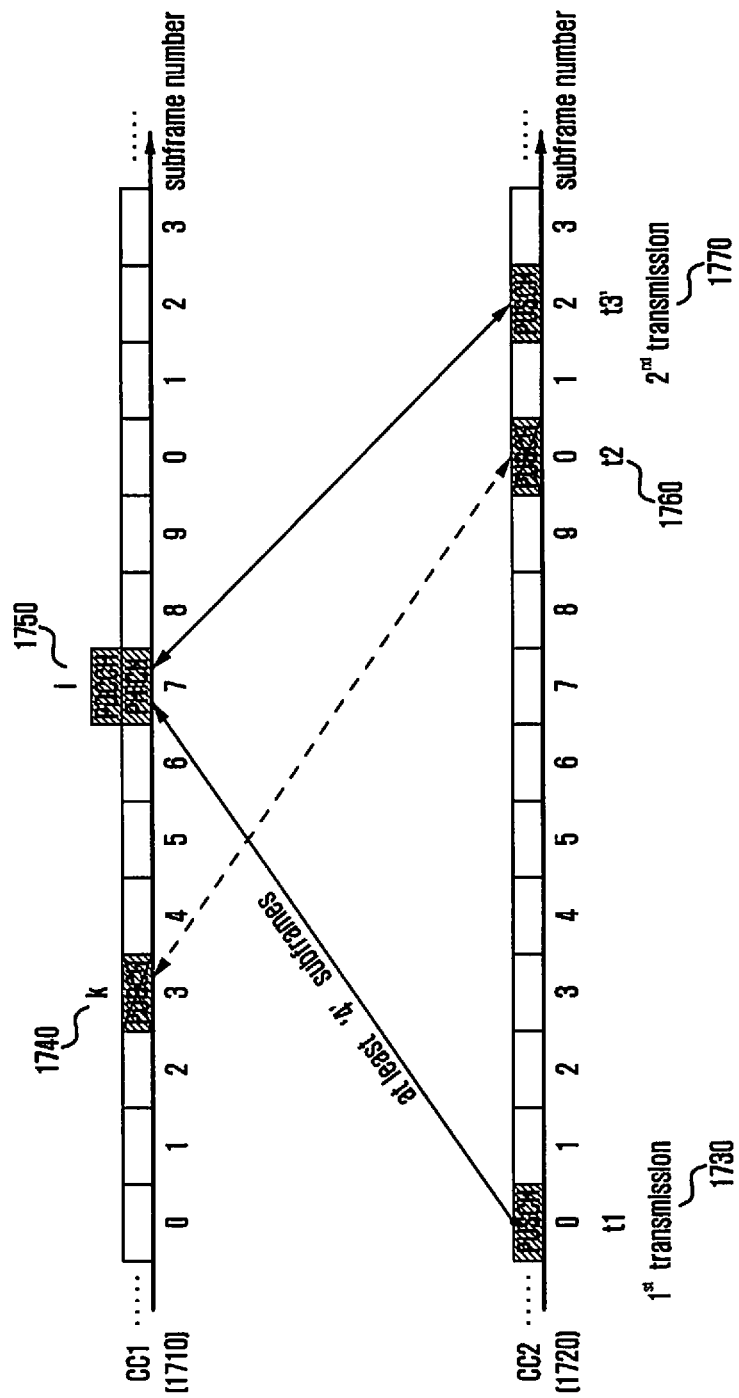
FIG. 17 is a diagram illustrating the transmission/reception timing relationship of the PDCCH and/or the PUSCH under the condition of i>k, according to another embodiment of the present invention

FIG. 17 shows an embodiment of the present invention in which the retransmission of the PUSCH at a subframe t1 1730 is adjusted from a subframe t2 1760 (1370 in FIG. 13) to a subframe t3' 1770 under the same condition as FIG. 13. The PDCCH for cross-carrier scheduling or the PHICH is transmitted on a first component carrier CC1 1710, and the PUSCH cross-carrier scheduled by the PDCCH is transmitted on a second component carrier CC2 1720. As the PUSCH retransmission timing is adjusted to the subframe 1770, a timing 1740 available for transmitting the PDCCH carrying the retransmission scheduling information for the PUSCH retransmission timing 1760 can be changed to subframe 1750. At this time, the eNB suspends scheduling other PUSCH than the retransmission PUSCH at the subframe t3' 1770 so as to minimize the transmission delay of the PUSCH retransmission.

According an embodiment of the present invention, the combinations of TDD configurations that cause a situation where i is greater than k (i>k) are excluded. Specifically, the predetermined combinations of the TDD configurations of the first and second cells can be one of the TDD configurations combinations satisfying the condition where i is less than or equal to k.

According to other embodiments of the present invention, the PHICH and/or the PDCCH transmission time duration can be determined in various modified ways in addition to the above-described methods.

Descriptions are provided below of the eNB and the UE supporting HARQ, according to an embodiment of the present invention, with reference to FIGS. 18 and 19.

Figure 18:
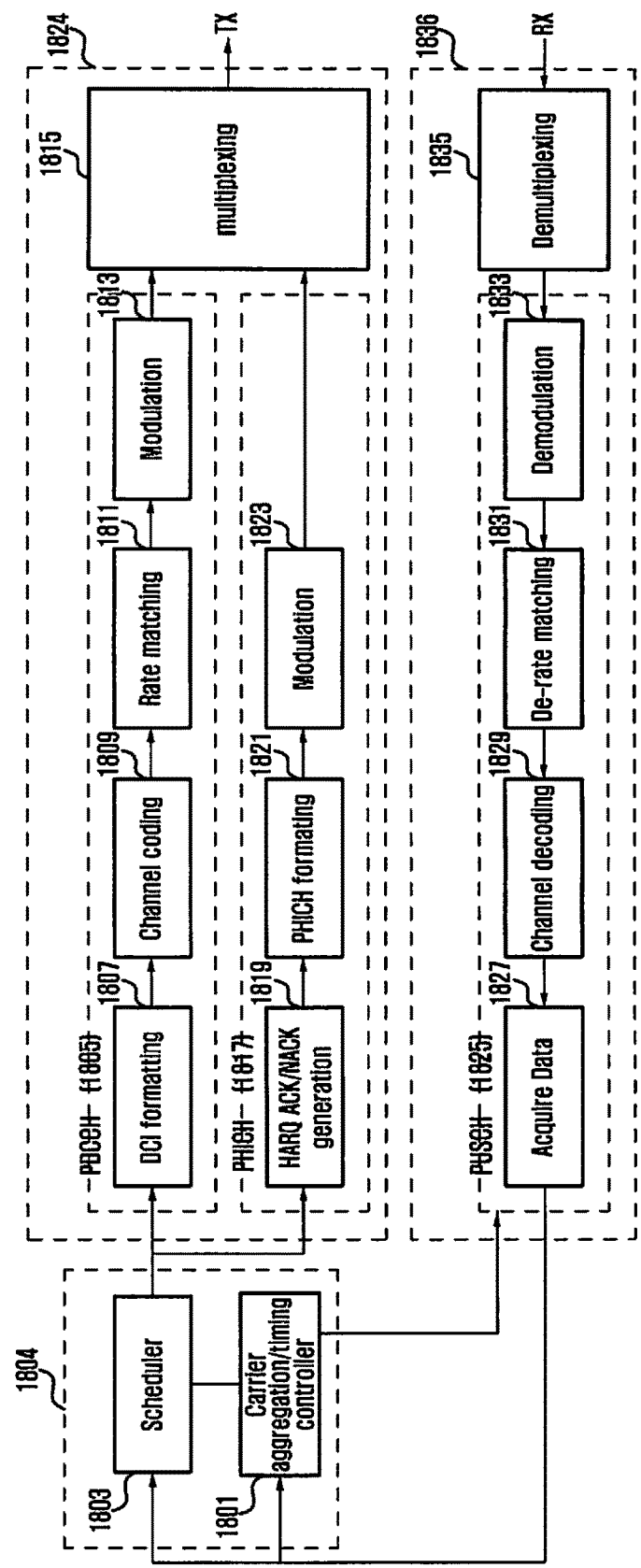
FIG. 18 is a block diagram illustrating a configuration of the eNB, according to an embodiment of the present invention.

FIG. 18 is a block diagram illustrating a configuration of the eNB, according to an embodiment of the present invention.

The eNB (i.e. the first transceiver) can include a reception part 1836, a transmission part 1824, and/or a control part 1804. The reception part 1836 can receive the data transmitted by the second transceiver (i.e. the UE) at the first subframe of the second cell (the second cell is scheduled by the first cell). The transmission part can transmit, to the second transceiver, the scheduling information for the HARQ acknowledgement corresponding to the first subframe and the second subframe (the second subframe is the earliest time duration available for data retransmission of the second transceiver since the first subframe of the second cell). The control part 1804 can control to transmit the HARQ acknowledgement and/or the scheduling information at one subframe among the subframes operated by the first cell that are included in the time duration between the first and second subframes operated by the second cell. The first and second cells can have different TDD configurations (TDD configuration represent the information on the arrangement of uplink and downlink subframes operated by a cell).

The transmission part can include a PDCCH block 1805, a PHICH block 1817, and multiplexer 1815. The reception part 1836 can include a PUSCH block 1825 and/or a demultiplexer 1835. The control part can include a CA and timing controller 1801 and/or a scheduler 1803.

The PDCCH block 1805 can include a DCI formatter 1807, a channel coder 1809, a rate matcher 1811, and/or a modulator 1813. The PHICH block 1817 can include an HARQ ACK/NACK generator 1819, a PHICH generator 1821, and/or a modulator 1823.

The PUSCH block 1825 can include a demodulator 1833, a de-rate matcher 1831, a channel decoder 1829, and/or a data acquirer 1827.

The CA and timing controller 1801 of the control part 1804 can adjust/determine aggregation of carriers for the UE to be scheduled and the timing relationship among the physical channels by referencing the data amount and/or available resource amount in the system. The CA and timing controller 1801 can provide the scheduler 1803 and/or the PUSCH block 1825 with the information on whether to aggregate carriers and/or timing relationship among the physical channels. Here, the timing relationship can follow description made with reference to FIGS. 1 to 17, according to an embodiment of the present invention.

For example, the CA and timing controller 1801 can control the PDCCH block 1805 and/or the PHICH block 1817 to match the transmission timings to each other by delaying the PHICH transmission timing to the PHICH transmission timing when the cross-carrier scheduling is applied and the available PHICH transmission timing (i.e., i), calculated as described with reference to FIGS. 5 to 11, is earlier than the available transmission timing (i.e., k) of the PDCCH for PUSCH retransmission. Also, the CA and timing controller 1801 can control the PUSCH block 1825 according to the PUSCH reception timing corresponding to the PHICH and/or PDCCH transmission timing.

The CA and timing controller 1801 can control the PDCCH block 1805 and/or PHICH block 1817 to match the PDCCH and PHICH transmission timings by delaying the PDCCH transmission timing to the PHICH transmission timing when the transmission timing of the PDCCH for scheduling PUSCH retransmission, which is calculated as described above with reference to FIGS. 12 to 17, is earlier than the PHICH transmission timing (i.e., k<i). The CA and timing controller 1801 can control the PUSCH block 1825 according to the PUSCH reception timing corresponding to the PHICH and/or PDCCH transmission timing.

The DCI formatter 1807 of the PDCCH block 1805 can generate DCI according to the control signal from the scheduler 1803. The channel coder 1809 performs channel coding on the DCI to add error correction code. The rate matcher 1811 matches the rate of the channel-coded DCI to the resource amount. The modulator 1813 modulates the rate-matched DCI to generate PDCCH. The multiplexer 1815 multiplexes the PDCCH and other signals in consideration of their transmission timings.

The HARQ ACK/NACK generator 1819 of the PHICH block 1817 receives the control signal from the scheduler 1803 and generates HARQ ACK/NACK corresponding to the PUSCH received from the UE. The PHICH formatter 1821 formats the HARQ ACK/NACK appropriate for the PHICH channel structure. The modulator 1823 can modulate the HARQ ACK/NACK formatted appropriate for the PHICH channel structure, and the multiplexer 1815 multiplexes the modulated HARQ ACK/NACK with other signals.

The signals multiplexed by the multiplexer 1815 can be transmitted to the UE in the form of an OFDM signal.

In the PUSCH block 1825 of the reception part 1836, the demultiplexer 1835 demultiplexes the signal received from the UE to extract the PUSCH. The demodulator 1833 can demodulate the PUSCH into the symbols before being rate-matched. The channel decoder 1829 decodes the symbols, and the data acquire 1827 acquires the data from the decoded signal. The data acquirer 1827 notifies the scheduler 1803 of the decoding result, i.e. whether the decoding is erroneous, and the scheduler 1803 controls the downlink HARQ ACK/NACK generation according to the decoding result. The CA and timing controller 1801 also can control the downlink HARQ ACK/NACK transmission timing based on the decoding result.

The eNB can further include a memory. The memory can store at least one of a mapping table mapping the $i^{th}$ subframe and $k^{th}$ subframe to each other according to the TDD configurations combinations of the first and second component carriers or a mapping table for the at least one subframe carrying the HARQ acknowledgement and/or scheduling information according to the TDD configurations combination. The control part 1804 can access the mapping table in the memory to control the signal transmission/reception timing according to the mapping table.

Figure 19:
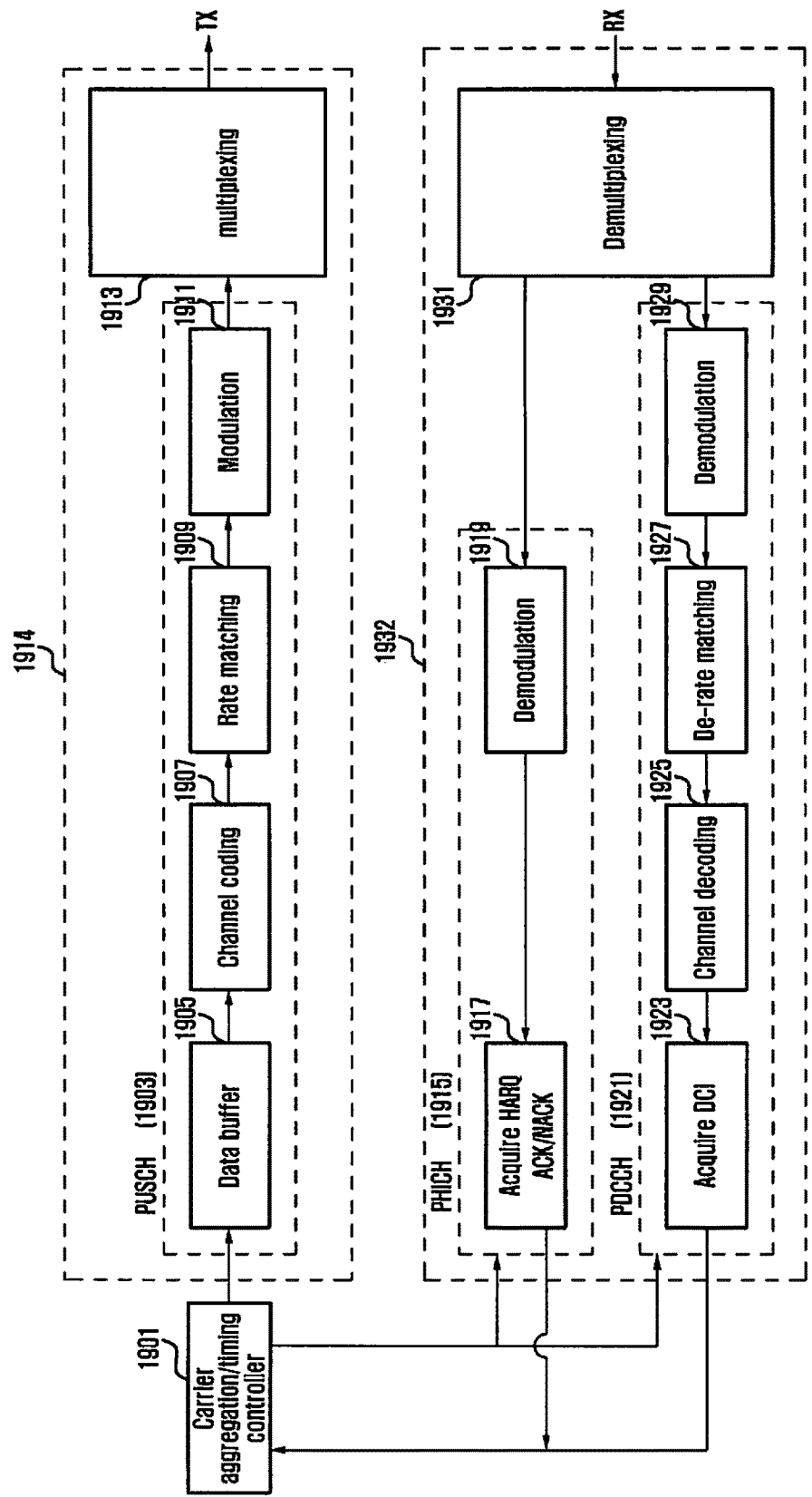
FIG. 19 is a block diagram illustrating a configuration of a UE, according to an embodiment of the present invention.

FIG. 19 is a block diagram illustrating a configuration of a UE, according to an embodiment of the present invention.

The UE (i.e., the second transceiver) includes a transmission part 1914, a reception part 1932, and/or a control part 1901. The transmission part 1914 can transmit data to the first transceiver (i.e., eNB) at the first subframe of the second cell (the second cell is scheduled by the first cell). The reception part 1932 can receive the scheduling information for the HARQ acknowledgement corresponding to the first subframe and/or the second subframe (the second subframe is the earliest time duration available for data retransmission to the first transceiver since the first subframe in the second cell). The control part 1901 can control such that the HARQ acknowledgement and/or scheduling information transmitted by the first transceiver in at least subframe among the subframes managed by the first cell in the time duration between the first and second subframes. The first and second cells can have different TDD configurations (TDD configuration represents the information on arrangement of the uplink and downlink subframes used in the cell).

The transmission part 1914 can include a PUSCH block 1903 and/or a multiplexer 1913. The reception part 1932 can include a PHICH block 1915, a PDCCH block 1921, and/or a demultiplexer 1931. The control part can be a CA and timing controller 1901 or include the CA and timing controller 1901.

The PUSCH block 1903 can include a data buffer 1905, a channel coder 1907, a rate matcher 1909, and/or a modulator 1911. The PHICH block 1915 can include an HARQ ACK/NACK acquirer 1917 and/or demodulator 1919, and the PDCCH block 1921 can include a demodulator 1929, a de-rate matcher 1927, a channel decoder 1925, and/or DCI acquirer 1923.

The CA and timing controller 1901 configures the carrier aggregation state for the UE based on the DCI received from the eNB, the component carrier for transmitting the PUSCH in cross carrier scheduling, and/or transmission timing relationship among the physical channels, and notifies the PUSCH block 1903, the PHICH block 1915, and the PDCCH block 1921 of the configuration result. The timing relationship follows the method described in embodiments of the present invention.

For example, the CA and timing controller 1901 can perceive that the transmission timings are matched to each other by delaying the PHICH transmission timing to the PHICH transmission timing when the cross-carrier scheduling is applied and the available PHICH transmission timing (i.e., i), calculated as described with reference to FIGS. 5 to 11, is earlier than the available transmission timing (i.e., k) of the PDCCH for PUSCH retransmission. The CA and timing controller 1901 also can control the PDCCH block 1921 and/or the PHICH block 1915 according to the PHICH and/or PDCCH reception timing and the PUSCH block 1903 according to the PUSCH transmission timing corresponding thereto.

The CA and timing controller 1901 also can perceive that the PDCCH and PHICH transmission timings are matched with each other by delaying the PDCCH transmission timing to the PHICH transmission timing when the transmission timing of the PDCCH for scheduling PUSCH retransmission which is calculated as described above with reference to FIGS. 12 to 17 is earlier than the PHICH transmission timing (i.e., k<i). The CA and timing controller 1901 also can control the PDCCH block 1921 and the PHICH block 1915 according to the PDCCH and/or PHICH reception timing and the PUSCH block 1903 according to the PUSCH transmission timing corresponding thereto.

The channel coder 1907 of the PUSCH block 1903 reads data from the data buffer 1905 performs channel coding on the data to add error correction code under the timing control of the CA and timing controller 1901. The rate matcher 1909 can match the channel-coded data to the allocated resource amount, and the modulator 1911 can modulate the rate-matched data. The multiplexer 1913 multiplexes the modulated data with other signals in consideration of the transmission timings.

The signals multiplexed by the multiplexer 1913 are converted to SC-FDMA signal to be transmitted to the eNB.

In the PHICH block 1915 of the reception part 1932, the demultiplexer 1931 extracts PHICH from the signal transmitted by the UE, and the demodulator 1919 demodulates the PHICH. The HARQ ACK/NACK acquirer 1917 can acquire a HARQ ACK or NACK for the demodulated PUSCH. The HARQ NACK or NACK for the PUSCH is delivered to the CA and timing controller 1901, the CA and timing controller 1901 can adjust the PUSCH retransmission timing according to the HARQ ACK/NACK.

In the PDCCH block 1921, the demultiplexer 1931 extracts PDCCH from the signal transmitted by the eNB, and the demodulator 1929 demodulates the extracted PDCCH. The de-rate matcher 1927 can reconfigure the demodulated PDCCH to the symbol before being rate-matched. The channel decoder 1925 performs channel decoding on the de-rate-matched PDCCH, and the DCI acquirer 1923 acquires DCI from the channel-decoded PDCCH. The acquired DCI is delivered to the CA and timing controller 1901, and the CA and timing controller 1901 can adjust the UEs' PUSCH transmission timing based on the acquired DCI.

The UE can further include a memory. The memory can have at least one of a mapping table mapping the $i^{th}$ subframe and $k^{th}$ subframe to each other according to the TDD configurations combinations of the first and second component carriers or a mapping table for the at least one subframe carrying the HARQ acknowledgement and/or scheduling information according to the TDD configurations combination. The CA and timing controller 1901 can access the mapping table in the memory to control the signal transmission/reception timing according to the mapping table.

Figure 20:
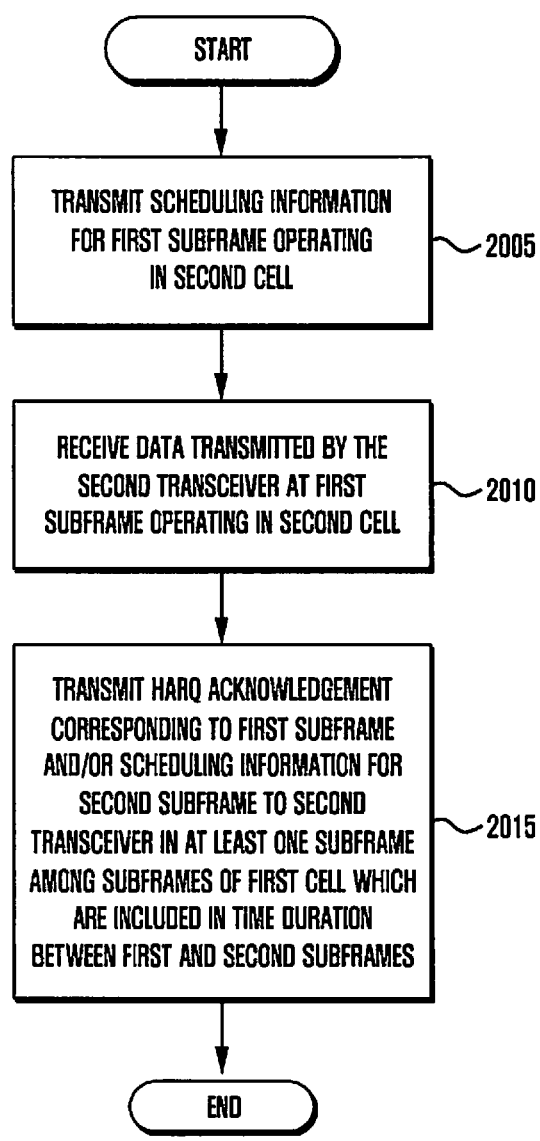
FIG. 20 is a flowchart illustrating a part of the first transceiver procedure in the HARQ method, according to an embodiment of the present invention.

FIG. 20 is a flowchart illustrating the first transceiver procedure in the HARQ method, according to an embodiment of the present invention.

The first transceiver can transmit scheduling information (e.g., the PDCCH) for the first subframe of the second cell, in step 2005. The first transceiver is the eNB, and the second transceiver is the UE. The second cell can be scheduled by the first cell.

The first transceiver can receive the data (e.g., the PUSCH) transmitted by the second transceiver at the first subframe of the second cell, in step 2010.

The first transceiver can transmit to the second transceiver the scheduling information (e.g., the PDCCH) for the HARQ acknowledgement (e.g., the PHICH) corresponding to the first frame or the scheduling information (e.g., the PDCCH) for the second subframe at least one subframe among the subframes of the first cell that are included in the time duration between the first and second subframe of the second cell, in step 2015. The second subframe can be the earliest time duration available for data transmission/retransmission of the second transceiver since the first subframe of the second cell. The first and second cell can have different TDD configurations. The TDD configuration can be the information on the arrangement of uplink and downlink subframes for use in the corresponding cell.

A description of the operations of the first transceiver supporting HARQ after step 2010, are described in detail with reference to FIGS. 21 to 23.

Figure 21:
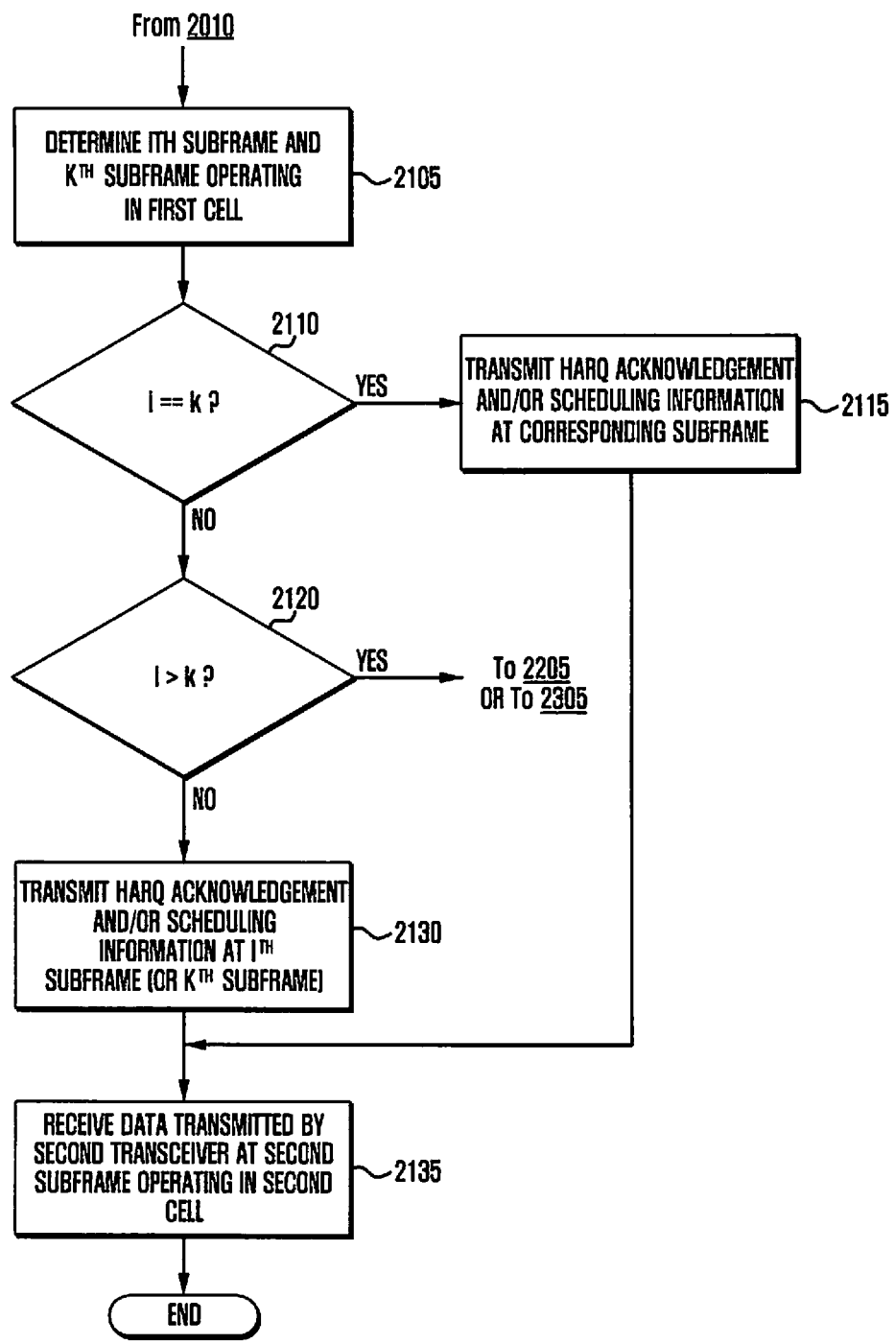
FIG. 21 is a flowchart illustrating another part of the first transceiver procedure in the HARQ method, according to an embodiment of the present invention.

As shown in FIG. 21, the first transceiver can determine the $i^{th}$ and $k^{th}$ subframes for use in the first cell, in step 2105. Here, i and k can be integers. The $i^{th}$ subframe can be the time duration available for the first transceiver to transmit the HARQ acknowledgement (e.g., the PHICH) in correspondence to the first subframe after the first subframe. The $k^{th}$ subframe can be the time duration available for the first transceiver to transmit the scheduling information (e.g., the PDCCH) for the second subframe before the second subframe. Here, i and k can be calculated by Equations (1) and (2) above.

The first transceiver can determine whether i and k are equal to each other, in step 2110. If i and k are equal to each other (i=k), the first transceiver can transmit HARQ acknowledgement and/or scheduling information at the $i^{th}$ subframe (or $k^{th}$ subframe), in step 2115.

If i and k are not equal to each other, the first transceiver determines whether i is greater than k, in step 2120.

If i is not greater than k, i.e., if i is less than k (i<k), the first transceiver can transmit the HARQ acknowledgement (e.g., the PHICH) corresponding to the first subframe and/or the scheduling information (e.g., the PDCCH) for the second subframe to the second transceiver at the $i^{th}$ subframe, in step 2130. The first transceiver also can transmit the PHICH and/or the PDCCH at the $k^{th}$ subframe. The first transceiver can receive data transmitted (or retransmitted) by the second transceiver at the second subframe of the second cell, in step 2135.

Figure 22:
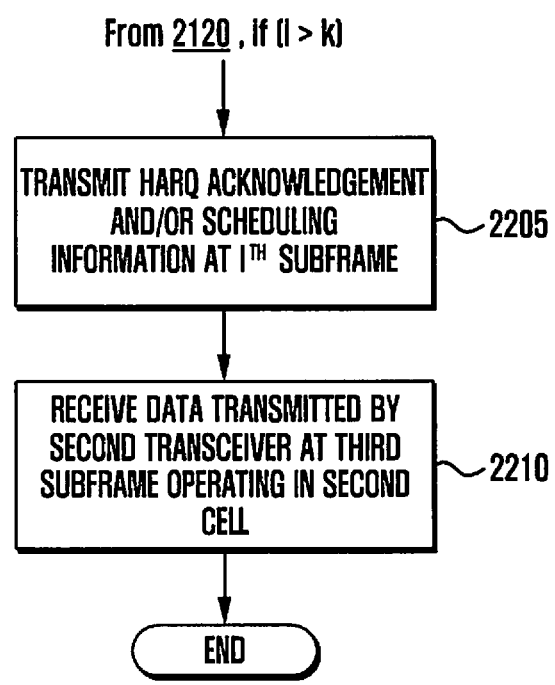
FIG. 22 is a flowchart illustrating another part of the first transceiver procedure in the HARQ method, according to an embodiment of the present invention.
Figure 23:
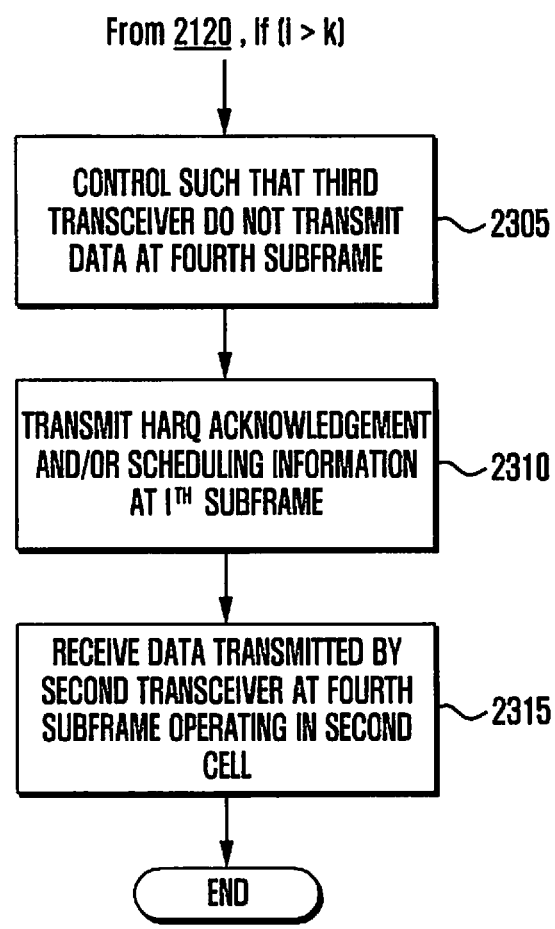
FIG. 23 is a flowchart illustrating still another part of the first transceiver procedure in the HARQ method, according to an embodiment of the present invention.

If i is greater than k (i>k) at step 2120, the methodology proceeds to step 2205 of FIG. 22, or step 2305 of FIG. 23.

With respect to FIG. 22, the first transceiver can transmit the HARQ acknowledgement corresponding to the first subframe and/or the scheduling information for the second subframe (or the third subframe) to the second transceiver at the $i^{th}$ subframe, in step 2205.

The first transceiver can receive the data transmitted (or retransmitted) by the second transceiver at the third subframe of the second cell, in step 2210. The third subframe can be the earliest time duration available for the second transceiver to transmit (or retransmit) data since the second subframe according to the synchronous HARQ scheme.

With respect to FIG. 23, the first transceiver can control such that the data from the third transceiver is not transmitted at the fourth subframe, in step 2305. The fourth subframe can be the earliest uplink subframe of the second cell, which appears since the second subframe. Specifically, the fourth subframe is the subframe having no relation with the uplink data transmission time duration of the synchronous HARQ related to the first subframe.

The first transceiver can transmit the HARQ acknowledgement corresponding to the first subframe and/or the scheduling information for the second subframe (or fourth subframe) at the $i^{th}$ subframe, in step 2310.

The first transceiver can receive the data transmitted (or retransmitted) by the second transceiver at the fourth subframe of the second cell, in step 2315.

The operations of the first transceiver at steps 2105, 2110, and 2120 can be performed before step 2005 or 2010 of FIG. 20. For example, the first transceiver can perform the $i^{th}$ and $k^{th}$ subframe determination of step 2105 using the TDD configurations of the first and second cell before step 2005 and compare i and k with each other at step 2110 and/or 2120. Accordingly, the first transceiver can know whether the procedure goes to step 2115 or 2130 of FIG. 21 or 2205 of FIG. 22 or 2305 of FIG. 23, after receiving the data from the second transceiver at step 2010.

Before step 2005 of FIG. 20, the first transceiver can retain the mapping for the $i^{th}$ and $k^{th}$ subframe according to the combination of the TDD configurations of the first and second cells or the mapping table for at least on subframe at which the HARQ acknowledgement and/or scheduling information is transmitted according to the TDD configuration in the memory. The mapping table can include the information on whether the procedure goes to step 2115 or 2130 of FIG. 21 or 2205 of FIG. 22 or 2305 of FIG. 23.

Figure 24:
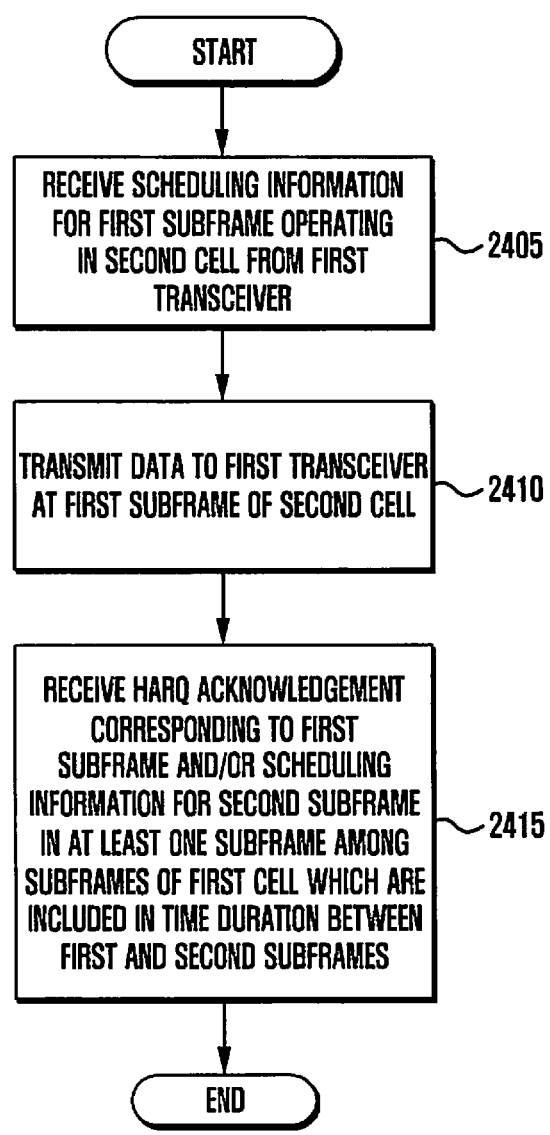
FIG. 24 is a flowchart illustrating a part of the second transceiver procedure in the HARQ method, according to an embodiment of the present invention.

FIG. 24 is a flowchart illustrating the second transceiver procedure in the HARQ method, according to an embodiment of the present invention.

The second transceiver can receive the scheduling information (e.g., the PDCCH) for the first subframe of the second cell from the first transceiver, in step 2405. The first transceiver can be the eNB, and the second transceiver can be the UE. Also, the second cell can be scheduled by the first cell.

The second transceiver can transmit data (e.g., the PUSCH) to the first transceiver at the first subframe of the second cell, in step 2410.

The second transceiver can receive the HARQ acknowledgement (e.g., the PHICH) corresponding to the first subframe and/or the scheduling information (e.g., the PDCCH) for the second subframe which has been transmitted by the first transceiver in at least one subframes of the first cell included in the time durations between the first and second subframes of the second cell, in step 2415. The second subframe can be the earliest time duration available for the second transceiver to transmit or retransmit the data since the first subframe of the second cell. The first and second cell can have different TDD configurations. The TDD configuration can be the information on the arrangement of the uplink and downlink subframes operate in association with the corresponding cell.

Figure 25:
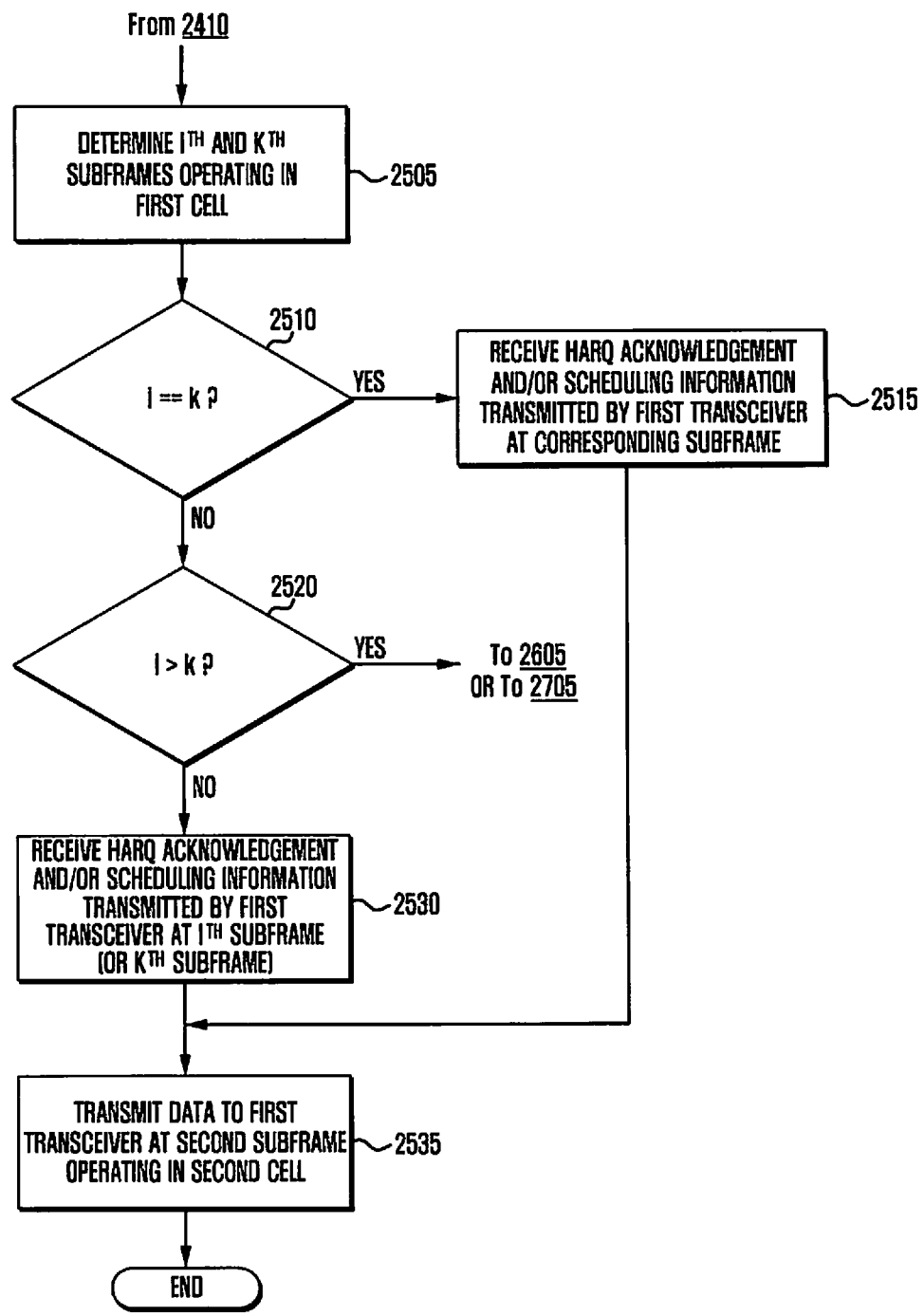
FIG. 25 is a flowchart illustrating another part of the second transceiver procedure in the HARQ method, according to an embodiment of the present invention.
Figure 26:
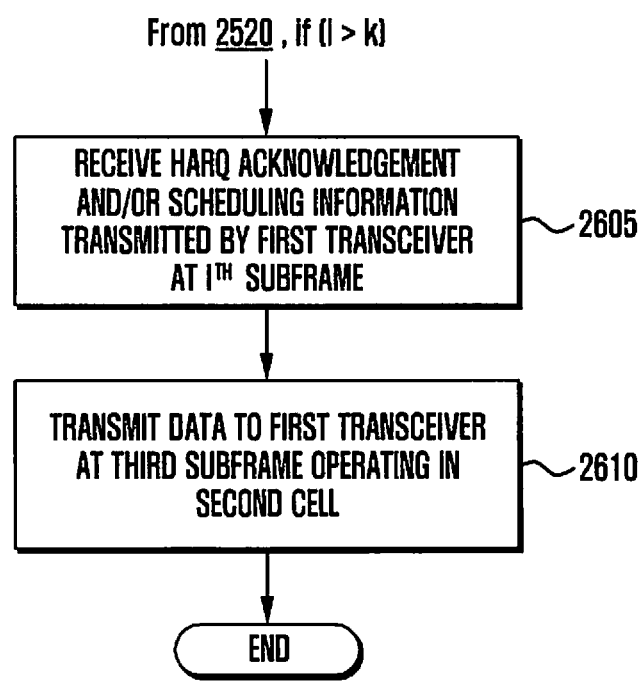
FIG. 26 is a flowchart illustrating another part of the second transceiver procedure in the HARQ method, according to an embodiment of the present invention.
Figure 27:
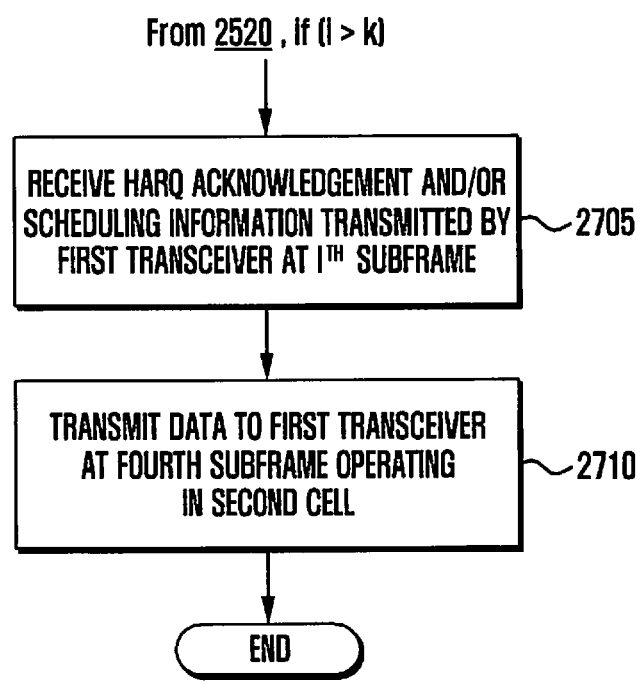
FIG. 27 is a flowchart illustrating still another part of the second transceiver procedure in the HARQ method, according to an embodiment of the present invention.

A description of the operations of the second transceiver supporting HARQ after step 2410 is provided in detail with reference to FIGS. 25 to 27. With respect to FIG. 25, the second transceiver can determine $i^{th}$ and $k^{th}$ subframes for use in the first cell at step 2505. The $i^{th}$ subframe can be the time duration available for the first transceiver to transmit the HARQ acknowledgement (e.g., the PHICH) in correspondence to the first subframe after the first subframe. The $k^{th}$ subframe can be the time duration available for the first transceiver to transmit the scheduling information (e.g., the PDCCH) for the second subframe before the second subframe.

The second transceiver can determine whether i and k are equal to each other, in step 2510. If i and k are equal to each other (i==k), the second transceiver can receive HARQ acknowledgement and/or scheduling information transmitted by the first transceiver at the $i^{th}$ subframe (or $k^{th}$ subframe), in step 2515.

If i and k are not equal to each other, the second transceiver determines whether i is greater than k, in step 2520.

If i is not greater than k, i.e. if i is less than k (i<k), the second transceiver can receive the HARQ acknowledgement (e.g., the PHICH) corresponding to the first subframe and/or the scheduling information (e.g., the PDCCH) for the second subframe transmitted by the first transceiver at the $i^{th}$ subframe, in step 2530. The second transceiver also can receive data transmitted (or retransmitted) by the first transceiver at $k^{th}$ subframe.

The second transceiver can transmit (or retransmit) the data to the first transceiver at the second subframe of the second cell, in step 2535.

If i is greater than k (i>k) at step 2520, the procedure goes to step 2605 of FIG. 26 or step 2705 of FIG. 7.

With respect to FIG. 26, the second transceiver can receive the HARQ acknowledgement corresponding to the first subframe and/or the scheduling information for the second subframe (or the third subframe) from the first transceiver at the $i^{th}$ subframe, in step 2605.

The second transceiver can transmit (or retransmit) the data to the first transceiver at the third subframe of the second cell, in step 2610. The third subframe can be the earliest time duration available for the second transceiver to transmit (or retransmit) data since the second subframe according to the synchronous HARQ scheme.

With respect to FIG. 27, the second transceiver can receive, at $i^{th}$ subframe, the HARQ acknowledgement corresponding to the first subframe and/or the scheduling information for the second subframe (or the fourth subframe) that has been transmitted by the first transmitter, in step 2705. The fourth subframe can be the earliest uplink subframe of the second cell, which appears since the second subframe. The second transceiver can transmit (or retransmit) the data to the first transceiver at the fourth subframe of the second cell, in step 2710.

The operations of the second transceiver at steps 2505, 2510, and 2520 can be performed before step 2405 or 2410 of FIG. 24. For example, the second transceiver can perform the $i^{th}$ and $k^{th}$ subframe determination of step 2505 using the TDD configurations of the first and second cell and compare i and k with each other at step 2510 and/or 2520. Accordingly, the second transceiver can know whether the procedure goes to step 2515 or 2530 of FIG. 25 or 2605 of FIG. 26 or 2705 of FIG. 27, after receiving the data from the first transceiver at step 2410.

Before step 2405 of FIG. 24, the second transceiver can retain the mapping for the $i^{th}$ and $k^{th}$ subframes according to the combination of the TDD configurations of the first and second cells or the mapping table for at least one subframe at which the HARQ acknowledgement and/or scheduling information is transmitted according to the TDD configuration in the memory. At this time, the mapping table can include the information on whether the procedure goes to step 2515 or 2530 of FIG. 25 or 2605 of FIG. 26 or 2705 of FIG. 27.

A descriptions is made of the method for defining the timing between PUSCH transmission in the second cell and the PDCCH transmission in the first cell for scheduling the PUSCH (hereinafter, referred to as "first timing" for convenience purpose) and the timing for transmitting the PHICH carrying the HARQ ACK/NACK corresponding to the PUSCH of the second cell in the first cell (hereinafter, referred to as "second timing" for convenience purpose), when the first cell performs cross-carrier scheduling on the PUSCH of the first cell. In detail, when both the first and second cells are operating with uplink subframes at the second cell's PUSCH transmission timing, the first and second timings following the timing between PDCCH and PUSCH and the timing between the PUSCH and PHICH defined in the TDD configuration of the first cell respectively. This is described in detail below with respect to FIG. 28.

Figure 28:
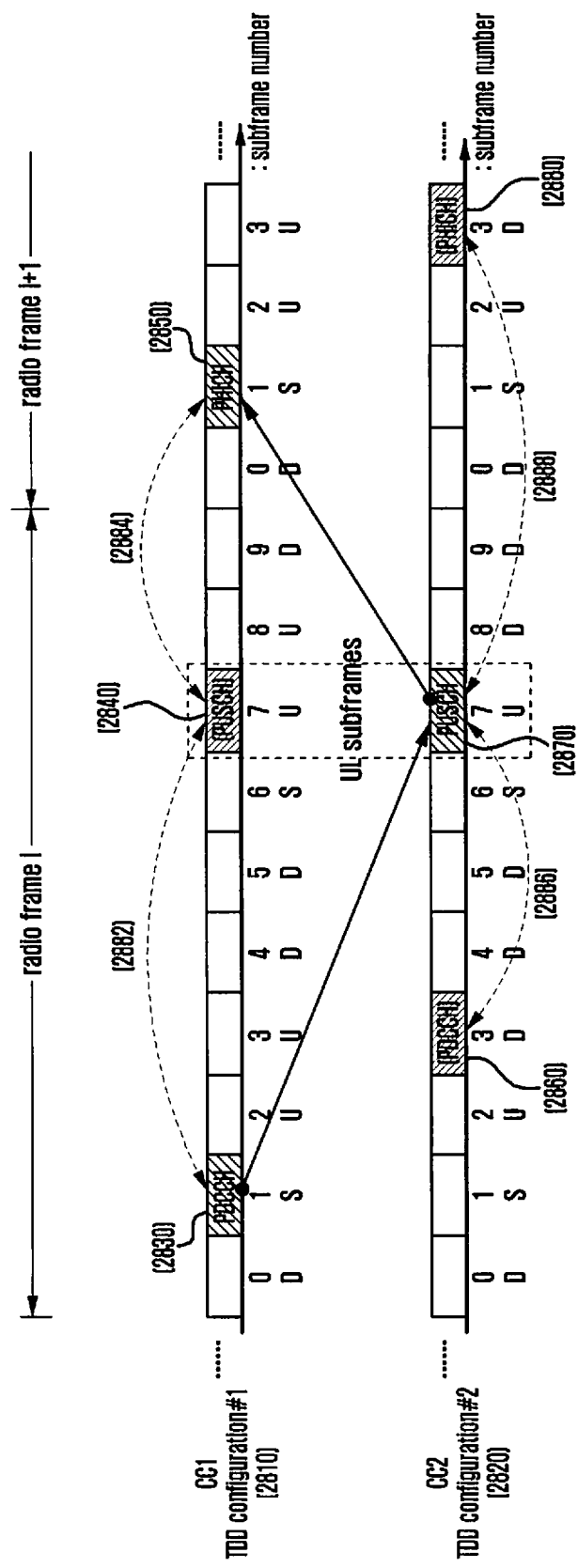
FIG. 28 is a diagram illustrating the first and second timings, according to an embodiment of the present invention.

FIG. 28 is a diagram illustrating the first and second timings, according to an embodiment of the present invention. Specifically, FIG. 28 shows signal transmission/reception timings in the TDD system operating two aggregated component carriers, i.e., CC1 2810 in the TDD uplink-downlink configuration #1 and CC2 2820 in the uplink-downlink configuration #2. Although FIG. 28 is directed to the case where the radio frame timings of the CC1 2810 and the CC2 2820 match with each other, the eNB and/or UE supporting HARQ can operate in case where the timings on the two different component carriers do not match.

In FIG. 28, it is assumed that the PDCCH for cross-carrier scheduling the PUSCH to be transmitted on the PUSCH is transmitted on the CC1 2810 as the first component carrier.

Also, it is assumed that both the CC1 2810 and the CC2 2820 are at uplink subframe time durations when the PUSCH is transmitted. Specifically, a subframe 7 2840 of the CC1 2810 is the uplink subframe and a subframe 7 2870 of the $i^{th}$ radio frame at which the PUSCH is transmitted is the uplink subframe too.

According to an interval 2882 applied by the timing between the PDCCH (or the PHICH) and the PUSCH in Table 3 defined for the TDD uplink-downlink configuration #1, the PDCCH for scheduling the PUSCH of the subframe 7 2840 of $i^{th}$ radio frame is transmitted at a subframe 1 2830 of $i^{th}$ subframe. According to an interval 2884 applied by the timing between the PUSCH and the PHICH in Table 3 defined for the TDD uplink-downlink configuration #1, the PHICH corresponding to the PUSCH carried in the subframe 7 2840 of the $i^{th}$ radio frame is transmitted in a subframe 1 2850 of $(i+1)^{th}$ radio frame.

According to an interval 2886 applied by the timing between the PDCCH (or the PHICH) and the PUSCH in Table 2 defined for the TDD uplink-downlink configuration #2, the PDCCH for scheduling the PUSCH carried in the subframe 7 2870 of the $i^{th}$ radio frame is transmitted at a subframe 3 2860 of the $i^{th}$ radio frame. Also, according to an interval 2888 applied by the timing between the PUSCH and the PHICH in Table 3 defined for the TDD uplink-downlink configuration #2, the PHICH corresponding to the PUSCH carried at the subframe 7 2870 of the $i^{th}$ radio frame can be transmitted at a subframe 3 2880 of the $(i+1)^{th}$ radio frame.

According to an embodiment of the present invention, when it is intended to perform cross-carrier scheduling on the UE's PUSCH transmission at the subframe 7 2870 of the ith radio frame on CC2 2830, the eNB operates as if the PUSCH is transmitted on the CC1 2810, such that the first timing match the timing between the PDCCH (or the PHICH) and the PUSCH in the TDD uplink-downlink configuration #1. Accordingly, the PDCCH for cross-carrier scheduling the PUSCH to be transmitted at the subframe 7 2870 of the ith subframe on the CC2 2820 is transmitted at the subframe 1 2830 of the $i^{th}$ radio frame. In FIG. 28, the description has been made under the assumption that both the CC1 2810 and CC2 2820 carry special subframes. However, the subframe carrying the PDCCH on the CC1 2810 can be a special subframe or a downlink subframe. At the timing when the PDCCH is transmitted on the CC1 2810, the CC2 2820 can carry a special subframe, downlink subframe, or uplink subframe.

The PHICH corresponding to the PUSCH cross-carrier scheduled by the PDCCH on the CC1 2810 and transmitted by the UE on the CC2 2820 is transmitted on the CC1 2810 on which the PDCCH has been transmitted. The eNB operates as if the PUSCH is transmitted on the CC1 2810 so as to match the second timing to the timing between the PUSCH and PHICH in correspondence to the TDD uplink-downlink configuration #1 of the CC1 2810. Accordingly, the HARQ ACK/NACK corresponding to the PUSCH transmitted at the subframe 7 2870 of $i^{th}$ radio frame of the CC2 2820 is transmitted through PHICH at the subframe 1 2850 of $(i+1)^{th}$ radio frame of the CC1 2810.

When the PDCCH for scheduling adaptive retransmission of the PUSCH is transmitted, the PDCCH is transmitted at the subframe 1 2850 of (i+1)th radio frame of the CC1 2810, which is equal to the timing of the PHICH. In FIG. 28, the description has been made under the assumption that both the CC1 2810 and the CC2 2820 carry the special subframes at the timing when the PHICH or the PDCCH for scheduling the adaptive retransmission is transmitted. However, the subframe of the CC1 2810 for transmitting the PHICH or the PDCCH for scheduling the adaptive retransmission can be a special subframe or a downlink subframe. Also, while the PHICH or the PDCCH for scheduling the adaptive retransmission is transmitted on the CC1 2810, the CC2 2820 can carry a special subframe, a downlink subframe, or an uplink subframe.

Figure 29:
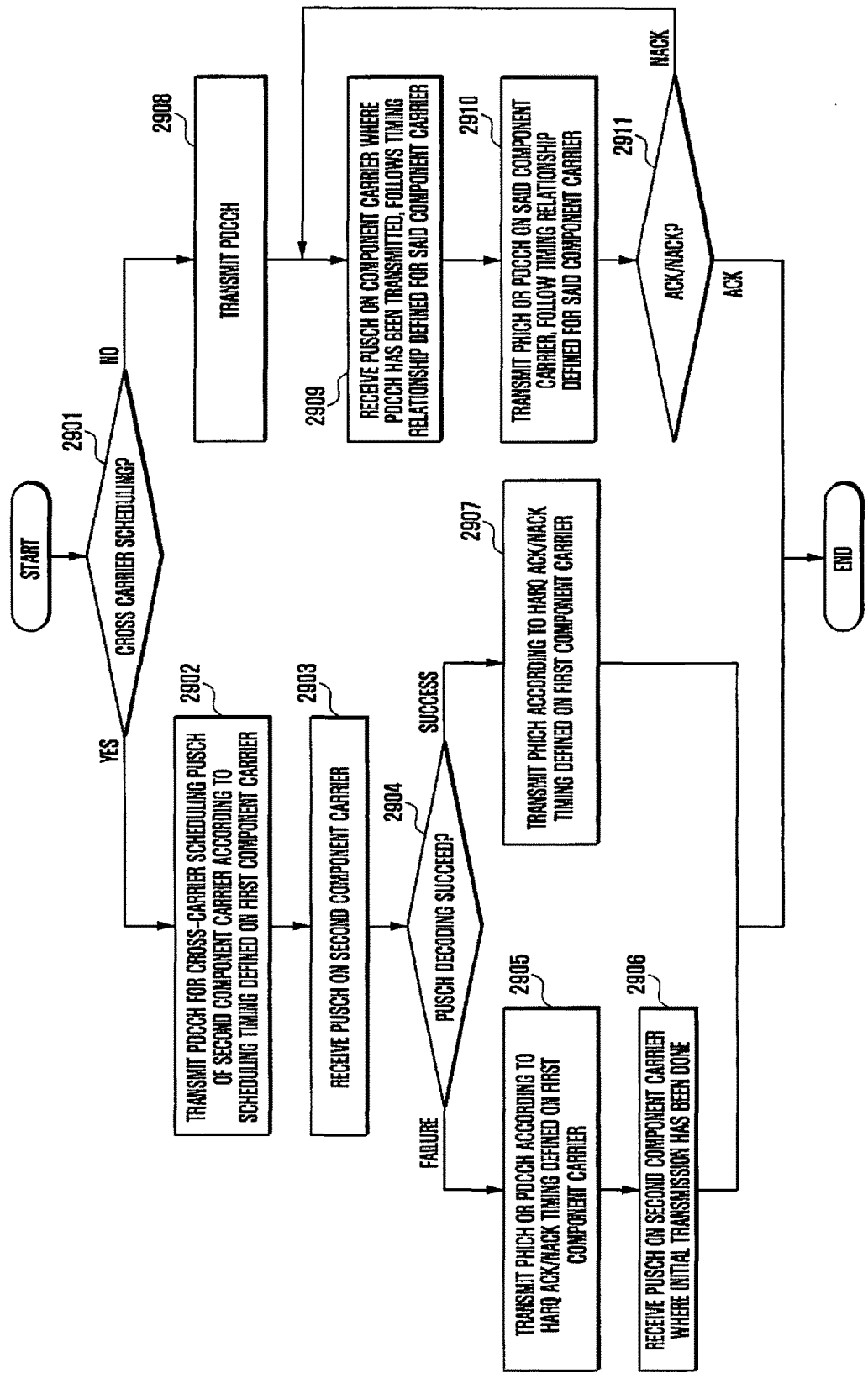
FIG. 29 is a flowchart illustrating an eNB procedure in the HARQ method, according to an embodiment of the present invention.

FIG. 29 is a flowchart illustrating an eNB procedure in the HARQ method, according to an embodiment of the present invention. FIG. 29 is directed to the case where the subframe carrying the PUSCH on the second component carrier is an uplink subframe, while the subframe of the first component carrier is the uplink subframe too.

The eNB can determine whether to enable the cross-carrier scheduling at a certain timing, in step 2901. If it is determined to enable the cross-carrier scheduling, the eNB can transmit the PDCCH for cross-carrier scheduling the PUSCH of the second component carrier on the first component carrier, according to the scheduling timing between the PDCCH (or the PHICH) and the PUSCH that is defined on the first component carrier, in step 2902.

The eNB can receive the PUSCH transmitted by the UE on the second component carrier, according to the timing between the PDCCH (or the PHICH) and the PUSCH of the first component carrier, in step 2903. The eNB decodes the PUSCH to determine whether to transmit ACK/NACK, in step 2904.

If the PUSCH decoding fails so as to transmit NACK at step 2904, the eNB can transmit the PHICH and/or the PDCCH for scheduling adaptive retransmission, according to the timing between the PUSCH and the PHICH that is defined on the first component carrier, in step 2905. The eNB can receive the PUSCH retransmission on the second component carrier on which the initial transmission has been done, in step 2906.

If the PUSCH decoding succeeds so as to transmit ACK at step 2904, the eNB can transmit the PHICH according to the HARQ ACK/NACK timing defined on the first component carrier, in step 2907.

Returning to step 2901, if it is determined to disable the cross-carrier scheduling, e.g., it is determined to transmit the PDCCH for scheduling the PUSCH to be transmitted on the first component carrier, the eNB can transmit the PDCCH carrying DCI for scheduling the PUSCH to the UE, in step 2908.

The eNB can receive the PUSCH at the PUSCH reception timing defined in the legacy standard (e.g., LTE/LTE-A) on the component carrier where the PDCCH has been transmitted, in step 2909. The eNB can transmit the PHICH or the PDCCH for adaptive retransmission abased on the PUSCH decoding result, according to the timing defined in the legacy standard, in step 2910.

The eNB decodes the received PUSCH to determine whether to transmit ACK/NACK, in step 2911. If it is determined to transmit an ACK, the eNB can schedule new data or ends the procedure. If it is determined to transmit a NACK, the procedure returns to step 2909 to receive the PUSCH retransmission.

Figure 30:
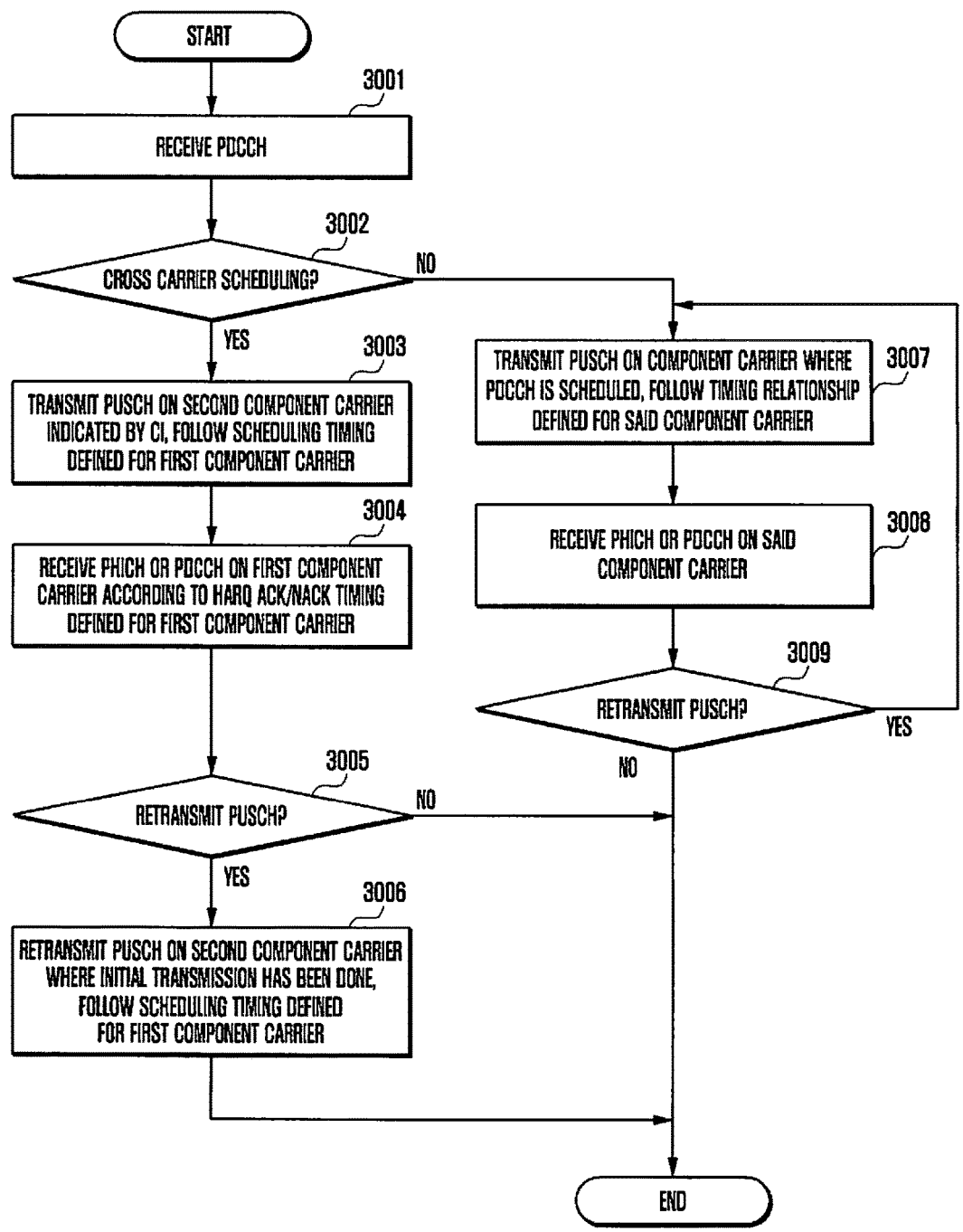
FIG. 30 is a flowchart illustrating a UE procedure in the HARQ method, according to an embodiment of the present invention.

FIG. 30 is a flowchart illustrating a UE procedure in the HARQ method, according to an embodiment of the present invention. FIG. 30 is directed to the case where the subframe carrying the PUSCH on the second component carrier is an uplink subframe, while the subframe of the first component carrier is the uplink subframe too.

Referring to FIG. 30, the UE receives the PDCCH, in step 3001. The UE decodes the PDCCH to determine whether the cross-carrier scheduling is enabled, in step 3002.

If it is determined that the cross-carrier scheduling is enabled, the UE transmits the PUSCH on the second component carrier indicated by a carrier indicator, in step 3003. The PUSCH is transmitted according to the timing between the PDCCH (or the PHICH) and the PUSCH, which is defined on the first component carrier.

The UE receives the PHICH or the PDCCH on the first component carrier according to the timing between the PUSCH and the PHICH, which is defined on the first component carrier, in step 3004. The UE determines whether to retransmit the PUSCH based on the received PHICH and/or PDCCH, in step 3005. If it is determined not to retransmit the PUSCH, the UE can end the procedure for supporting HARQ, according to an embodiment of the present invention. If it is determined to retransmit the PUSCH, the UE retransmits the PUSCH on the second component carrier where the initial transmission has been performed, in step 3006. The retransmission follows the scheduling timing between the PDCCH (or the PHICH) and the PUSCH, which is defined on the first component carrier.

Returning to step 3002, if it is determined that the cross-carrier scheduling is disabled, the UE can transmit, to the eNB, the PUSCH on the component carrier where the PDCCH has been transmitted, in step 3007. The PUSCH transmission timing can follow the timing relationship between the PDCCH and the PUSCH, which is defined for the component carrier in the legacy standard (e.g., LTE/LTE-A).

The UE can receive the PHICH and/or the PDCCH on the component carrier where the PUSCH has been transmitted according to the timing relationship between the PUSCH and the PHICH/PDCCH that is defined in the legacy standard, in step 3008. The UE can determine whether to retransmit the PUSCH based on the information carried in the received PHICH and/or PDCCH, in step 3009. If it is determined to retransmit the PUSCH, the procedure returns to step 3007. If it is determined not to retransmit the PUSCH, the UE ends the operation for supporting the HARQ, according to an embodiment of the present invention.

The eNB and UE can be configured as shown in FIGS. 18 and 19.

The methods according to the above-described embodiments can be implemented in the form of program command executable by various computer means and stored in computer-readable storage media. The computer readable storage media can store the program commands, data files, and data structures in individual or combined forms. The program commands recorded in the storage medium can be designed and implemented for the present invention or used by those skilled in the computer software field.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for communication of a terminal in a communication system, the method comprising:
   receiving downlink control information (DCI) for scheduling a second cell;
   transmitting uplink data corresponding to the DCI on a first subframe of the second cell; and
   receiving feedback information for the uplink data on a second subframe identified based on a time division duplex (TDD) uplink/downlink (UL/DL) configuration of a first cell, when the first cell and the second cell are configured for the terminal, the TDD UL/DL configuration of the first cell and a TDD UL/DL configuration of the second cell are different, and the DCI for scheduling the second cell is received on the first cell.

2. The method of claim 1, wherein any subframe of the TDD UL/DL configuration of the first cell that corresponds to an uplink subframe of the TDD UL/DL configuration of the second cell is an uplink subframe.

3. The method of claim 1, wherein the DCI comprises a carrier indicator corresponding to the second cell.

4. The method of claim 1, wherein the TDD UL/DL configuration of the first cell is a TDD UL/DL configuration 1 and the TDD UL/DL configuration of the second cell is a TDD UL/DL configuration 2.

5. The method of claim 1, wherein the second subframe corresponds to a subframe number i and the first subframe corresponds to a subframe number i-k, and
   wherein a value corresponding to k is identified based on the following table,

| TDD UL/DL Config- | DL subframe number i | | | | | | | | | |
|---|---|---|---|---|---|---|---|---|---|---|
| uration | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 | wherein the TDD UL/DL Configuration in the table corresponds to the TDD UL/DL configuration of the first cell.

6. A method for communication of a base station, in a communication system, the method comprising:
   transmitting, to a terminal, downlink control information (DCI) for scheduling a second cell;
   receiving, from the terminal, uplink data corresponding to the DCI on a first subframe of the second cell; and
   transmitting, to the terminal, feedback information for the uplink data on a second subframe identified based on a time division duplex (TDD) uplink/downlink (UL/DL) configuration of a first cell, when the first cell and the second cell are configured for the terminal, the TDD UL/DL configuration of the first cell and a TDD UL/DL configuration of the second cell are different, and the DCI for scheduling the second cell is received on the first cell.

7. The method of claim 6, wherein any subframe of the TDD UL/DL configuration of the first cell that corresponds to an uplink subframe of the TDD UL/DL configuration of the second cell is an uplink subframe.

8. The method of claim 6, wherein the DCI comprises a carrier indicator corresponding to the second cell.

9. The method of claim 6, wherein the TDD UL/DL configuration of the first cell is a TDD UL/DL configuration 1 and the TDD UL/DL configuration of the second cell is a TDD UL/DL configuration 2.

10. The method of claim 6, wherein the second subframe corresponds to a subframe number i and the first subframe corresponds to a subframe number i-k, and wherein a value corresponding to k is identified based on the following table,

| TDD UL/DL Config-uration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | | 6 | |
| 3 | 6 | | | | | | | | 6 | 6 |
| 4 | | | | | | | | | 6 | 6 |
| 5 | | | | | | | 6 | | | |
| 6 | 6 | 4 | | | | 7 | 4 | | | 6 | wherein the TDD UL/DL Configuration corresponds to the TDD UL/DL configuration of the first cell.

11. A terminal in a communication system, the terminal comprising:
a transceiver configured to transmit and receive a signal; and
a controller coupled to the transceiver and configured to:
receive downlink control information (DCI) for scheduling a second cell,
transmit uplink data corresponding to the DCI on a first subframe of the second cell, and
receive feedback information for the uplink data on a second subframe identified based on a time division duplex (TDD) uplink/downlink (UL/DL) configuration of a first cell, if the first cell and the second cell are configured for the terminal, the TDD UL/DL configuration of the first cell and a TDD UL/DL configuration of the second cell are different, and the DCI for scheduling the second cell is received on the first cell.

12. The terminal of claim 11, wherein any subframe of the TDD UL/DL configuration of the first cell corresponding to an uplink subframe of the TDD UL/DL configuration of the second cell is an uplink subframe.

13. The terminal of claim 11, wherein the DCI comprises a carrier indicator corresponding to the second cell.

14. The terminal of claim 11, wherein the TDD UL/DL configuration of the first cell is a TDD UL/DL configuration 1 and the TDD UL/DL configuration of the second cell is a TDD UL/DL configuration 2.

15. The terminal of claim 11, wherein the second subframe corresponds to a subframe number i and the first subframe corresponds to a subframe number i-k, and
wherein a value corresponding to k is identified based on the following table,

| TDD UL/DL Config-uration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | | 6 | |
| 3 | 6 | | | | | | | | 6 | 6 |
| 4 | | | | | | | | | 6 | 6 |
| 5 | | | | | | | 6 | | | |
| 6 | 6 | 4 | | | | 7 | 4 | | | 6 | wherein the TDD UL/DL Configuration in the table corresponds to the TDD UL/DL configuration of the first cell.

16. A base station in a communication system, the base station comprising:
a transceiver configured to transmit and receive a signal; and
a controller coupled to the transceiver and configured to:
transmit, to a terminal, downlink control information (DCI) for scheduling a second cell,
receive, from the terminal, uplink data corresponding to the DCI on a first subframe of the second cell, and
transmit, to the terminal, feedback information for the uplink data on a second subframe identified based on a time division duplex (TDD) uplink/downlink (UL/DL) configuration of a first cell, if the first cell and the second cell are configured for the terminal, the TDD UL/DL configuration of the first cell and a TDD UL/DL configuration of the second cell are different, and the DCI for scheduling the second cell is received on the first cell.

17. The base station of claim 16, wherein any subframe of the TDD UL/DL configuration of the first cell corresponding to an uplink subframe of the TDD UL/DL configuration of the second cell is an uplink subframe.

18. The base station of claim 16, wherein the DCI comprises a carrier indicator corresponding to the second cell.

19. The base station of claim 16, wherein the TDD UL/DL configuration of the first cell is a TDD UL/DL configuration 1 and the TDD UL/DL configuration of the second cell is a TDD UL/DL configuration 2.

20. The base station of claim 16, wherein the second subframe corresponds to a subframe number i and the first subframe corresponds to a subframe number i-k, and
wherein a value corresponding to k is identified based on the following table,

| TDD UL/DL Config-uration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | | 6 | |
| 3 | 6 | | | | | | | | 6 | 6 |
| 4 | | | | | | | | | 6 | 6 |
| 5 | | | | | | | 6 | | | |
| 6 | 6 | 4 | | | | 7 | 4 | | | 6 | wherein the TDD UL/DL Configuration corresponds to the TDD UL/DL configuration of the first cell.

* * * * *

UNITED STATES PATENT AND TRADEMARK OFFICE
CERTIFICATE OF CORRECTION

Page 1 of 1

PATENT NO. : 10,069,611 B2
APPLICATION NO. : 15/443703
DATED : September 4, 2018
INVENTOR(S) : Youngbum Kim et al.

It is certified that error appears in the above-identified patent and that said Letters Patent is hereby corrected as shown below:

On the Title Page

(30) Foreign Application Priority Data
Please add:
Dec. 20, 2011  (KR) .............................. 10-2011-0138472

Signed and Sealed this
Twenty-sixth Day of March, 2019

Andrei Iancu
*Director of the United States Patent and Trademark Office*